US012596995B2

(12) United States Patent
Killoran, Jr. et al.

(10) Patent No.: US 12,596,995 B2
(45) Date of Patent: *Apr. 7, 2026

(54) MYRIAD OF PAYMENT METHODS WITH ALTERNATE PAYMENT CONTROLS

(71) Applicant: SWOOP IP HOLDINGS LLC, Wilmington, DE (US)

(72) Inventors: John P. Killoran, Jr., Albuquerque, NM (US); Patrick Killoran, Jackson Heights, NY (US); Corey Englebrake, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 253 days.

This patent is subject to a terminal disclaimer.

(21) Appl. No.: 17/884,084

(22) Filed: Aug. 9, 2022

(65) Prior Publication Data

US 2022/0383310 A1     Dec. 1, 2022

Related U.S. Application Data

(63) Continuation of application No. 15/209,338, filed on Jul. 13, 2016, now Pat. No. 11,416,829.

(Continued)

(51) Int. Cl.
*G06Q 10/109*          (2023.01)
*G06Q 20/12*           (2012.01)
(Continued)

(52) U.S. Cl.
CPC ......... *G06Q 10/1097* (2013.01); *G06Q 20/12* (2013.01); *G06Q 20/227* (2013.01);
(Continued)

(58) Field of Classification Search
CPC .. G06Q 10/1097; G06Q 20/12; G06Q 20/227; G06Q 20/3255; G06Q 20/367;
(Continued)

(56) References Cited

U.S. PATENT DOCUMENTS 6,101,485 A      8/2000   Fortenberry et al.
6,167,435 A     12/2000   Druckenmiller et al.
(Continued)

OTHER PUBLICATIONS

Ron White, How Computers Work, 2003, Que, 7$^{th}$ (Year: 2003).

*Primary Examiner* — Yingying Zhou
(74) *Attorney, Agent, or Firm* — Volpe Koenig

(57)          ABSTRACT

A system and method for providing an email as a command is disclosed. The system and method include formatting an action in an e-commerce system based on an assigned address, wherein communication with the assigned address initiates the action, and authenticating a message addressed to the assigned address, wherein for a positively authenticated message the action is performed. The system and method may also include receiving the message sent to the assigned address. For negatively authenticated messages, the system and method include providing a sender of the message a sign-up to enable positive authentication. The system and method may include requesting details of the action based on the message. The system and method may include sending an invoice for the action to the address that sent the authenticated message and processing a payment based on a response to the sent invoice.

19 Claims, 34 Drawing Sheets

800

Related U.S. Application Data

(60) Provisional application No. 62/205,511, filed on Aug. 14, 2015, provisional application No. 62/191,841, filed on Jul. 13, 2015.

(51) Int. Cl.

| | |
|---|---|
| *G06Q 20/22* | (2012.01) |
| *G06Q 20/32* | (2012.01) |
| *G06Q 20/36* | (2012.01) |
| *G06Q 20/40* | (2012.01) |
| *G06Q 30/04* | (2012.01) |
| *H04L 51/046* | (2022.01) |
| *H04L 51/18* | (2022.01) |
| *H04L 51/52* | (2022.01) |
| *H04L 67/02* | (2022.01) |
| *H04W 4/14* | (2009.01) |

(52) U.S. Cl.
CPC ....... *G06Q 20/3255* (2013.01); *G06Q 20/367* (2013.01); *G06Q 20/40* (2013.01); *G06Q 30/04* (2013.01); *H04L 51/046* (2013.01); *H04L 51/18* (2013.01); *H04W 4/14* (2013.01); *H04L 51/52* (2022.05); *H04L 67/02* (2013.01)

(58) Field of Classification Search
CPC ...... G06Q 20/40; G06Q 30/04; G06Q 20/384; G06Q 20/386; H04L 51/046; H04L 51/18; H04L 51/52; H04L 67/02; H04W 4/14

See application file for complete search history.

(56) References Cited

U.S. PATENT DOCUMENTS

| | | | | |
|---|---|---|---|---|
| 7,801,961 B2 * | 9/2010 | Sachtjen | ............... | H04W 12/06 |
| | | | | 726/28 |
| 7,996,328 B1 | 8/2011 | Lundberg | | |
| 8,095,606 B1 * | 1/2012 | Wiley | .................. | G06Q 10/107 |
| | | | | 709/206 |
| 8,392,357 B1 * | 3/2013 | Zou | ........................ | H04L 51/212 |
| | | | | 715/752 |
| 8,538,845 B2 | 9/2013 | Liberty | | |
| 8,606,703 B1 * | 12/2013 | Dorsey | ............... | G06Q 10/107 |
| | | | | 705/40 |
| 8,725,635 B2 | 5/2014 | Klein et al. | | |
| 8,762,272 B1 * | 6/2014 | Cozens | ............... | G06Q 10/107 |
| | | | | 705/40 |
| 8,918,466 B2 * | 12/2014 | Yu | ........................ | H04L 51/212 |
| | | | | 709/206 |
| 9,143,476 B2 * | 9/2015 | Dreller | .................. | H04L 51/226 |
| 9,165,291 B1 * | 10/2015 | Andersen | ............... | G06Q 20/10 |
| 9,189,785 B2 | 11/2015 | Liberty et al. | | |
| 9,208,488 B2 | 12/2015 | Liberty | | |
| 9,654,431 B1 * | 5/2017 | Johansson | ............... | H04L 63/08 |
| 9,686,308 B1 * | 6/2017 | Srivastava | ............ | H04L 51/212 |
| 9,799,071 B1 * | 10/2017 | Wilson | ................... | G06Q 40/02 |
| 9,892,386 B2 | 2/2018 | Liberty | | |
| 10,230,755 B2 * | 3/2019 | Emigh | ............... | H04L 63/1483 |
| 10,277,628 B1 * | 4/2019 | Jakobsson | ........... | H04L 63/1483 |
| 10,284,597 B2 * | 5/2019 | Shuster | ............... | H04L 63/1483 |
| 10,395,223 B2 | 8/2019 | Muthu et al. | | |
| 10,515,345 B2 | 12/2019 | Koh et al. | | |
| 2002/0019851 A1 * | 2/2002 | Pollack | ................. | H04L 51/214 |
| | | | | 707/999.01 |
| 2004/0177121 A1 * | 9/2004 | Simyon | ................... | H04L 51/18 |
| | | | | 709/206 |
| 2006/0253335 A1 | 11/2006 | Keena et al. | | |
| 2007/0255620 A1 | 11/2007 | Tumminaro et al. | | |
| 2008/0114843 A1 * | 5/2008 | Shinde | ................. | G06Q 10/107 |
| | | | | 709/206 |
| 2009/0006233 A1 | 1/2009 | Chembtob | | |
| 2009/0271303 A1 * | 10/2009 | Weng | ..................... | G06Q 30/04 |
| | | | | 705/34 |
| 2009/0282108 A1 * | 11/2009 | Sachtjen | ................. | H04L 51/04 |
| | | | | 709/206 |
| 2010/0070419 A1 * | 3/2010 | Vadhri | ................. | G06Q 20/326 |
| | | | | 705/44 |
| 2011/0276479 A1 * | 11/2011 | Thomas | ................. | G06Q 20/12 |
| | | | | 705/40 |
| 2011/0289168 A1 * | 11/2011 | Allam | ..................... | H04L 51/23 |
| | | | | 709/206 |
| 2012/0130898 A1 | 5/2012 | Snyder et al. | | |
| 2012/0253896 A1 * | 10/2012 | Killoran, Jr. | ........... | G06Q 20/12 |
| | | | | 705/14.4 |
| 2013/0191892 A1 * | 7/2013 | Cadden | ..................... | H04L 9/32 |
| | | | | 726/5 |
| 2014/0025487 A1 * | 1/2014 | Killoran | ............. | G06Q 30/0253 |
| | | | | 705/14.49 |
| 2014/0052585 A1 * | 2/2014 | Ito | ...................... | G06Q 30/0635 |
| | | | | 705/26.81 |
| 2014/0082726 A1 * | 3/2014 | Dreller | .................... | H04L 51/48 |
| | | | | 726/23 |
| 2014/0215571 A1 * | 7/2014 | Shuster | ............... | H04L 63/1483 |
| | | | | 726/4 |
| 2014/0250198 A1 * | 9/2014 | Jorasch | ............... | G06Q 10/107 |
| | | | | 709/206 |
| 2014/0279447 A1 * | 9/2014 | Dorsey | ............... | G06Q 20/023 |
| | | | | 705/39 |
| 2014/0304828 A1 * | 10/2014 | Hollier | .................. | G06F 21/606 |
| | | | | 726/26 |
| 2015/0012426 A1 * | 1/2015 | Purves | ................. | G02B 27/017 |
| | | | | 705/41 |
| 2015/0134508 A1 | 5/2015 | Lucas | | |
| 2015/0178784 A1 * | 6/2015 | Oliver | ............... | G06Q 30/0267 |
| | | | | 705/14.64 |
| 2015/0264111 A1 * | 9/2015 | Aleksandrov | ........... | H04L 51/08 |
| | | | | 726/4 |
| 2016/0125371 A1 * | 5/2016 | Grassadonia | ........ | G06Q 20/405 |
| | | | | 705/44 |
| 2017/0255911 A1 | 9/2017 | Kassemi | | |

* cited by examiner

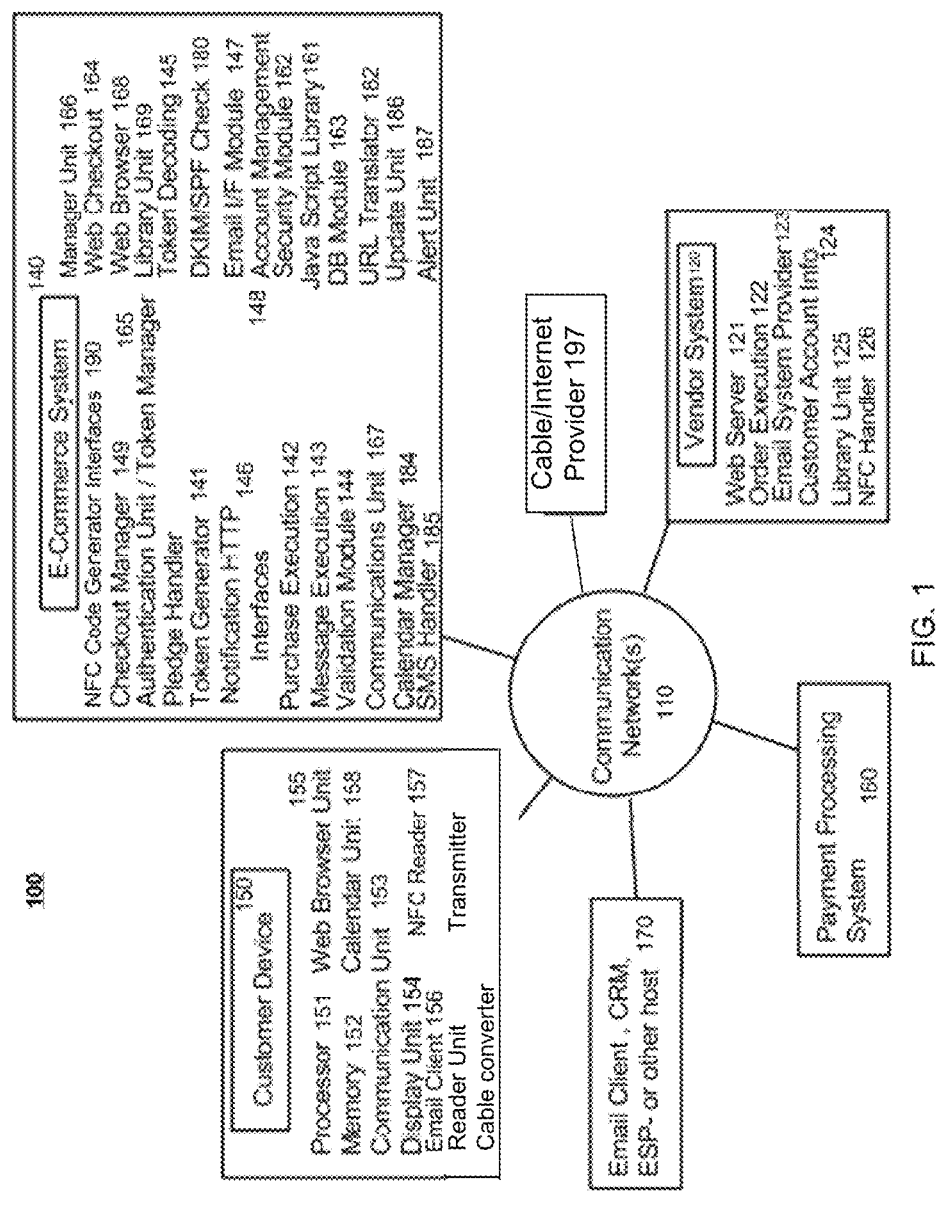

100

E-Commerce System 140

NFC Code Generator Interfaces 190
Checkout Manager 149
Authentication Unit / Token Manager 165
Pledge Handler
Token Generator 141
Notification HTTP 146
Interfaces
Purchase Execution 142
Message Execution 143
Validation Module 144
Communications Unit 167
Calendar Manager 184
SMS Handler 185

Manager Unit 166
Web Checkout 164
Web Browser 168
Library Unit 169
Token Decoding 145
DKIM/SPF Check 180
Email I/F Module 147
Account Management 148
Security Module 182
Java Script Library 161
DB Module 163
URL Translator 182
Update Unit 186
Alert Unit 187

Customer Device 150

Processor 151
Memory 152
Communication Unit 153
Display Unit 154
Email Client 156
Reader Unit
Cable converter Web Browser Unit 155
Calendar Unit 158
NFC Reader 157
Transmitter

Vendor System 120

Web Server 121
Order Execution 122
Email System Provider 123
Customer Account Info 124
Library Unit 125
NFC Handler 126

Cable/Internet Provider 197

Communication Network(s) 110

Email Client , CRM, ESP- or other host 170

Payment Processing System 160

Figure 5:
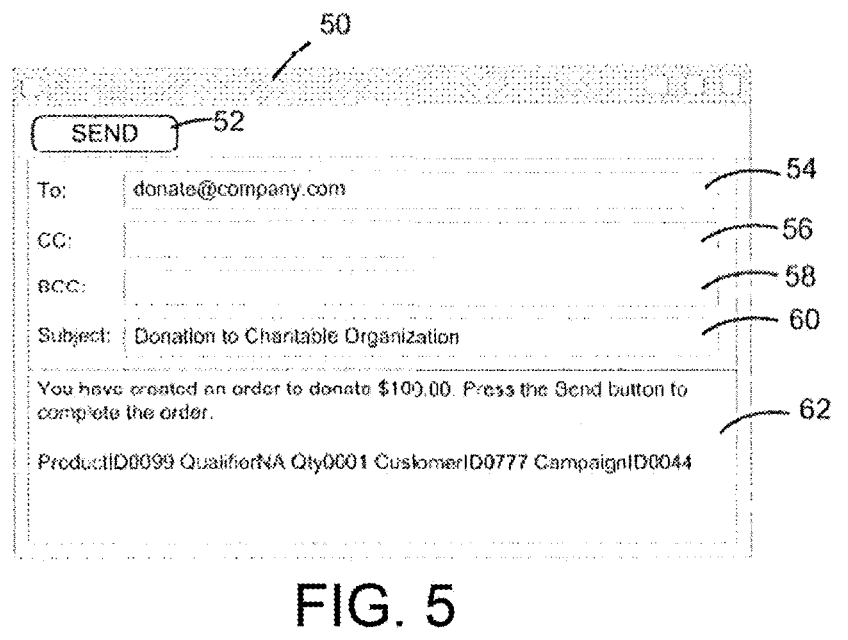

SEND —52

To:    donate@company.com    54

CC:    56

BCC:    58

Subject:    Donation to Charitable Organization    60

You have created an order to donate $100.00. Press the Send button to complete the order.    62

ProductID0099 QualifierNA Qty0001 CustomerID0777 CampaignID0044

MYRIAD OF PAYMENT METHODS WITH ALTERNATE PAYMENT CONTROLS

CROSS REFERENCE TO RELATED APPLICATIONS

This application is a Continuation of U.S. patent application Ser. No. 15/209,338 filed Jul. 13, 2016, which claims the benefit of U.S. Provisional Patent Application No. 62/191,841, entitled SMS, SOCIAL MEDIA, AND EMAIL-BASED PAYMENT WITH ALTERNATE PAYMENT CONTROLS, filed on Jul. 13, 2015 and U.S. Provisional Patent Application No. 62/205,511, entitled SMS, SOCIAL MEDIA, AND EMAIL-BASED PAYMENT WITH INTER-ACTIVE, SHOPPING CART AND POINT OF CASHIER CONTROLS, filed Aug. 14, 2015, which are incorporated by reference as if fully set forth.

FIELD OF INVENTION

The present invention is related to electronic commerce systems. More particularly, the present invention provides technological improvements to electronic commerce system. The present system and method facilitate electronic commerce by using one or more forms of Short Message Service (SMS), social media, email, scheduling applications, interactivity and point of sale cashier.

BACKGROUND

Mobile devices, such as smartphones, are becoming more and more advanced and providing more and more connectivity. Users want to connect to account using multiple different devices. These devices have become a technology which ties together many forms of communication into a single or set of customer devices. Multiple forms of messaging may occur on the same device for a single customer. Mobile devices have become a technology which aggregates many forms of communication into a single customer device, or set of linked customer devices such as a smartphone, a tablet, and a laptop. Text-based messaging on mobile devices is quickly becoming more popular than voice conversations. Customers prefer short continual text based conversations.

Mobile devices offer an increasing number of methods to make payments. Many vendors collect single point contacts in order to facilitate a payment. Vendors who collect an array of contacts generally do this for security. One form of electronic payment that may be performed is short message system (SMS). Generally, SMS payments are provided by the carrier with the carrier processing the payment. The carrier is the only source to process a payment using SMS and carrier fees tend to be high. Additionally, donating or purchasing via SMS often provides no receipt. The confirmation of payment is noted on the customer's phone bill.

Paying bills and making monthly donations for many customers is a hassle, with each vendor requiring a separate method of payment or sign up. The use of electronic wallets is growing in popularity; however, it is still fraught with problems. SMS payment methods offer a quick and easy way to make a payment of a specific amount. With most customers use multiple messaging forms to communicate, SMS as a payment method is increasingly shown as an insecure method for making a payment and is easily hacked. Therefore, a need exists for technology that enhances the myriad of technology available on mobile and other electronic devices, including SMS, social media and e-mailbased payments, to make payments and donations and provide alternate payment controls including interactive, shopping carts, point of cashier controls, and other alternative payment controls.

SUMMARY

A system and method for providing an email as a command is disclosed. The system and method include formatting an action in an e-commerce system based on an assigned address, wherein communication with the assigned address initiates the action, and authenticating a message addressed to the assigned address, wherein for a positively authenticated message the action is performed. The authenticating of the message is based on the address where the message originated. The address where the message originated is associated with a sender of the message. The message may be an email message or a Short Message Service (SMS) message. The system and method may also include receiving the message sent to the assigned address. A sender of the message may be a customer using a customer device. The formatting of the action may be initiated based on a request from a vendor. For negatively authenticated messages, the system and method include providing a sender of the message a sign-up to enable positive authentication such as by providing a Universal Resource Locator (URL) link. The system and method may include requesting details of the action based on the message. The details may be requested from a vendor. The system and method may include sending an invoice for the action to the address that sent the authenticated message and processing a payment based on a response to the sent invoice. The system and method may include authenticating the response to the sent invoice before processing the payment.

A system and method for sending payment reminders in conjunction with a calendar application on a mobile device is also disclosed. The system and method include receiving a vendor request of a payment prior to a date the payment is due on a mobile device, accepting an invitation to make the payment and adding the payment to a calendar application with an alert for the date on which the payment is to be paid, the alert including a mailto link, requesting, from an e-commerce system, a token to enable the payment to be made to the vendor, the token being update to identify the vendor and the payee and included in the calendar application alert, and activating an alert message mailto link to generate a response, the response including the token and being sent to the e-commerce system wherein the e-commerce system is configured to receive the message and token causing a notification to be sent to the vendor to process the payment.

BRIEF DESCRIPTION OF THE DRAWINGS

A more detailed understanding may be had from the following description, given by way of example in conjunction with the accompanying drawings wherein:

FIG. 1 illustrates a system diagram of an Email-Based E-commerce System;

FIG. 5 illustrates an email message for ordering a donation;

DETAILED DESCRIPTION OF THE EMBODIMENTS

Figure 2:
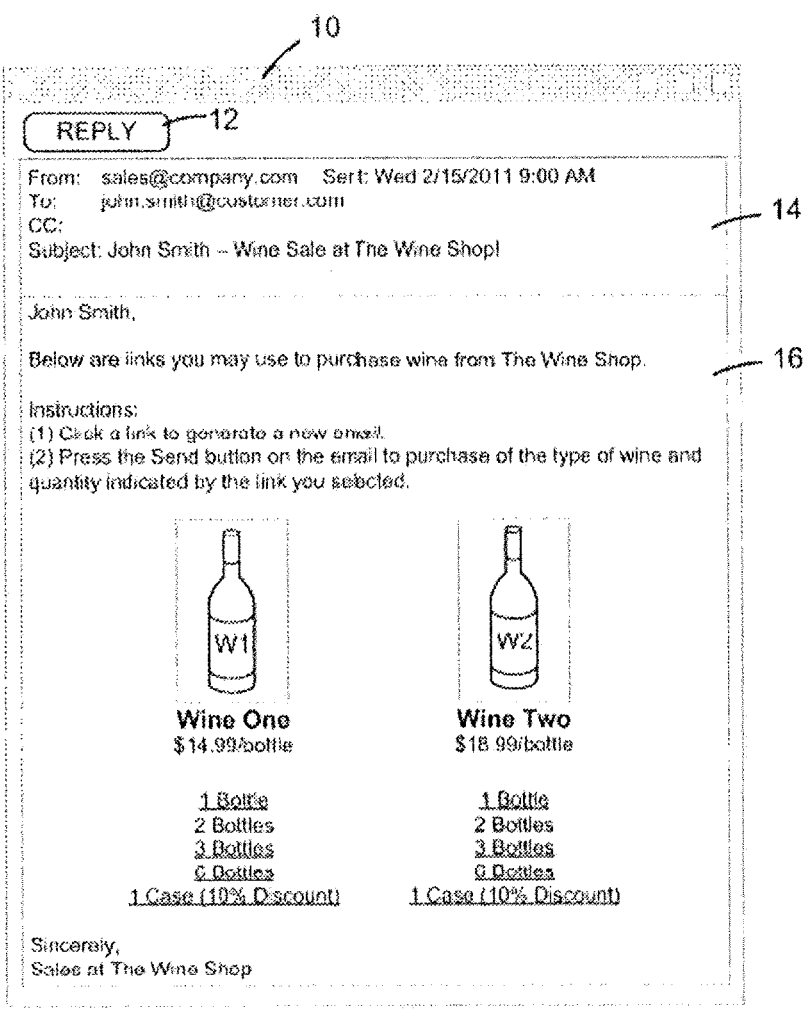
FIG. 2 illustrates an example email message that solicits the purchase of goods from a vendor.

All embodiments described below may be used in tandem or in relation to specific vendor or customer needs. They may also be integrated with an email service provider, customer relationship management, or directly with a payment processor. Payment processing may occur in any number of ways using multiple gateways, banks, credit cards, debit cards, gift cards, direct carrier billing, automatic clearing houses, or virtual currency. Although the description below focuses on the use of Short Message Service (SMS), email messaging and social media networks may also be used. Although the examples and discussion herein generally use SMS, other texting formats may be substituted for SMS including Extensible Markup Language (XMPP), Session Initiation Protocol (SIP), Voice over Internet Protocol (ViOP), multimedia messaging service (MMS), Messaging Queuing Telemetry Transport (MQTT), and Apple Push Notification Service (APNS) used in services such as Whatsapp, Viber, Facebook Messenger, iMessage and other forms Internet Telephony Protocols. The configuration of the system may vary accordingly.

The described system and method collects multiple contacts from each customer allowing greater flexibility and security in payment processing and offers greater choice and flexibility in the method of payment. The described system and method may authenticate an SMS payment request and process a payment without the aid of the phone carrier. The present system and method may provide customers with immediate receipts required for taxes and expenses. The described system and method may integrate payment options via SMS, social media, email, and web-based checkouts with other applications such as calendar applications. The present system and method may allow for seamless transitions from one communication format to another on mobile devices. The present system and method using different formats of communication to confirm transactions and act as a fail-safe to confirm a customer's identity online provides greater security. The described system and method provides product information via Short Message Service (SMS) or social media, with short prompted responses to determine a customer's desired purchase and process their payment. The present system and method consolidates a customer's payments into a single message and response. The present system and method provides cashiers in brick and mortar stores, who can offer a method for paying a specific amount by using SMS to message a phone number, offer a simple straightforward method to make a payment using their mobile phone. The present system and method maintains the ease of SMS with the security of other media. The present system and method exploits the capacity to shift between messaging applications, to heighten security, and increase convenience.

A method and apparatus disclosed herein configures the E-commerce System, such as an Email Payment Gateway, also referred to as the e-commerce system, to enable vendors to send emails to customers allowing customers to make payments for specific amounts by selecting mailto hyperlinks associated with each amount and sending the email to the e-commerce system. Each mailto link holds a token generated by the e-commerce system. The e-commerce system may validate and authenticate the email and decode the token. This system may be integrated with SMS and Social Media messaging. The e-commerce system is designed to give customers a fluid relationship between different modes of messaging with the goal of completing a secure payment. The system and method provide an interactive experience to customers allowing the customer greater choice and ease in purchase.

An e-commerce system to facilitate transactions between a customer and a vendor is disclosed. FIG. 1 illustrates a system diagram of an email based e-commerce system that integrates SMS, social media, email with interactive messaging, and in store cashier applications for online e-commerce payment processing, and calendar applications for online e-commerce payment processing, pledging and alternate payment control.

FIG. 1 illustrates a system diagram of an Email-Based E-commerce System 100. The Email-Based E-commerce System 100 may integrate SMS and social media for online e-commerce. It describes the integration of investment portfolio management and bill payment. FIG. 1 shows an example system 100 that may be used for vendor token generation that may be used in e-commerce transactions. The example system 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154, a web browser unit 155, which may communicate data to/from the web server module(s) in the vendor server 120 and payment server 160, email client 156, and near field communication (NFC) reader 157. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plugin modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The customer device 150 may also include a calendar unit or calendar application, and a messaging unit, also referred to as a SMS or social media application 159.

Calendar unit 158 may also include or be referred to as calendar software or a calendar application. Calendar unit 158 may include calendaring software that at least includes or provides users with an electronic version of a calendar. Additionally, the software may provide an appointment book, address book, and/or contact list. These tools are an extension of many of the features provided by time management software such as desk accessory packages and computer office automation systems. Calendaring is a standard feature of many PDAs, EDAs, and smartphones. The software may be stored or house locally on a computing device or customer device 150, often designed for individual use, e.g. Lightning extension for Mozilla Thunderbird, Microsoft Outlook without Exchange Server, or Windows Calendar, or may be a networked-based software that allows for the sharing of information between users, e.g. Mozilla Sunbird, Windows Live Calendar, Google Calendar, or Microsoft Outlook with Exchange Server.

SMS or social media application 159 may be any application that provides access to texting including SMS or to social media application wither directly or using a web link.

The vendor system 120 may include a web server 121, order execution unit 122, an email system provider 123, customer account info 124, a library unit 125, and an NFC handler 126. The vendor system may be substituted for a financial management system as illustrated in the examples described herein.

The web server 121 provides a website that may be accessed by a customer device 150. The web server 121 may implement HTTP protocol, and may communicate Hypertext Markup Language (HTML) pages and related data from the website to/from the customer device 150 using HTTP. The vendor server 120 may be connected to one or more private or public networks (such as the Internet), via which the web server 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS)

server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 130.

The memory may be configured to store information associated with e-commerce transactions. This may include inventory information, information used to generate web pages, customer information, and other e-commerce data.

The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, a Universal Resource Locator (URL) translator 181, and an NFC code generator interface 190. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator 141 may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token—a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request—typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly, DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and Fast-Mail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
h=MTIzNDU2Nzg5MDEyMzQ1Njc4OTAxMjM0NTY3 ODkwMTI=;
b=dzdVyOfAKCdLXdJOc9G2q8LoXS1EniSbav+ yuU4zGeeruD00lszZ VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is it's expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

E-commerce system 140 may also include a pledge handler 183, a calendar manager or calendar application 184, a SMS handler 185, an update unit 186, and an alert unit 187. SMS handler 185 is a device or element within the e-commerce system 140 that can handle SMS communication and can receive, decode/encode SMS communications. An update unit 186 provides updates within the e-commerce system 140. Alert unit 187 is a unit that provides alerts within the e-commerce system 140.

Pledge handler 183 is an element designed to handle pledges. This may include the portion of the system that receives identification of an intent to pay or perform and monitors and tracks such a pledge.

Calendar manager or calendar application 184 may be of the same type as calendar unit 150 of customer device 150. Calendar 184 may be linked or in communication with calendar 158. Calendar application 184 may be any of the types of calendar described above with respect to calendar 158, the type of which may not be influenced by the type of calendar of calendar 158.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

Credit card vault 195 may also be included in E-Commerce System 100. Credit card vault 195 may include any credit clearing house. This is shown as being independent from any of the other entities in the system including customer device 150, e-commerce system 140, vendor system 120, payment processing system 160, and banking server (not shown) for example. Credit card vault 195 may be housed, received input or be a combination of the clearinghouse portion of any of the other entities in the system including customer device 150, e-commerce system 140, vendor system 120, payment processing system 160, and banking server (not shown) and is shown as a separate entity only for ease of understanding and clarity.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. Pat. No. 9,152,980 which issued on Oct. 6, 2015 entitled EMAIL-BASED E-COMMERCE, which is a continuation of U.S. Pat. No. 8,775,623 which issued on Jul. 8, 2014 entitled SYSTEM AND METHOD FOR EMAIL-BASED E-COMMERCE, and U.S. Pat. No. 9,058,591 which issued on Jun. 16, 2015 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator 141 that allows vendors to directly create tokens. In another example, a third party may have a token generator 141 to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains one or more mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this system 100, a vendor via vendor system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

FIG. 2 illustrates an example email message that solicits the purchase of goods from a vendor. FIG. 2 shows an email display window 10 that may be used by the email client module of customer device 150 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 140 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 2, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 150 when that link is selected.

The "1 Bottle" link beneath the picture of the Wine One bottle may include information that, if selected, generates an email message that, if received by the e-commerce system 140, will indicate to the e-commerce system 140 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 140, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 140, will indicate to the e-commerce system 140 that John Smith may like to purchase two bottles of Wine One. According to this example, the "2 Bottles" link may be defined as follows:

<a href="mailto:sales@company.com?subject=Purchase percent 20from percent 20Wine percent 20Shop percent 20 and body=You percent 20have percent 20created percent 20an percent 20order percent 20for percent 20two percent 20bottles percent 20of percent 20Wine percent 20One. percent 20Press percent 20the percent 20Send percent 20button percent 20to percent 20complete percent 20the percent 20order. percent 0A percent 0AProductID0005 percent 20QualifierNA percent 20Qty0002 percent 20CustomerID0777 percent 20CampaignID0003" target="_blank">2 Bottles</a> mailto:sales@company.com?Subject="Press send to pay $42.99 to Wine Shop"? body="TEXT XXX-XXX-XXX-XXX"

In addition, the token identifier may be part of the To: address, or any other portion of an address field, or the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the e-commerce system 140, the e-commerce system 140 may perform a look-up of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 150 may receive a user input that indicates that one of the links displayed in the message body area 16 is selected. The user input may be, for example, a mouse click, keyboard input, or any other type of input that indicates that a link is selected. The email client module of customer device 150 may, in response to this user input, generate and display an order email message as specified by the selected link.

Figure 3:
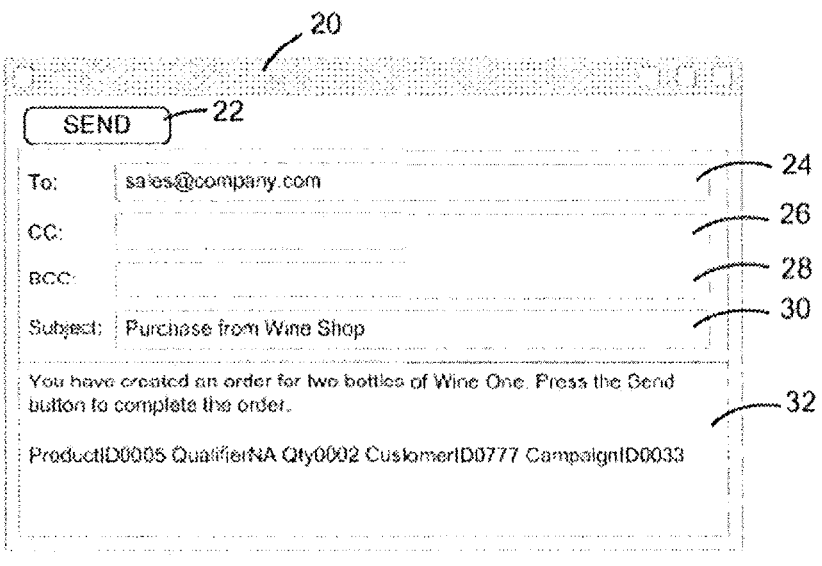
FIG. 3 illustrates an email message for placing an order.

FIG. 3 illustrates an email message for placing an order. FIG. 3 shows an example message composition window 20 that may be displayed in response to a selection of a link from the message body area 16 of the email display window 10 of FIG. 2. The message composition window 20 of FIG. 3 may include a Send button 22, a To area 24, a CC area 26, a BCC area 28, a Subject area 30, and a message body area 32. The Send button 22 in the message composition window 20 of FIG. 3 may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 3 shows an example wherein the "2 Bottles" link beneath the picture of the Wine One and described above with reference to FIG. 2 is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 3, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 2 is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 4:
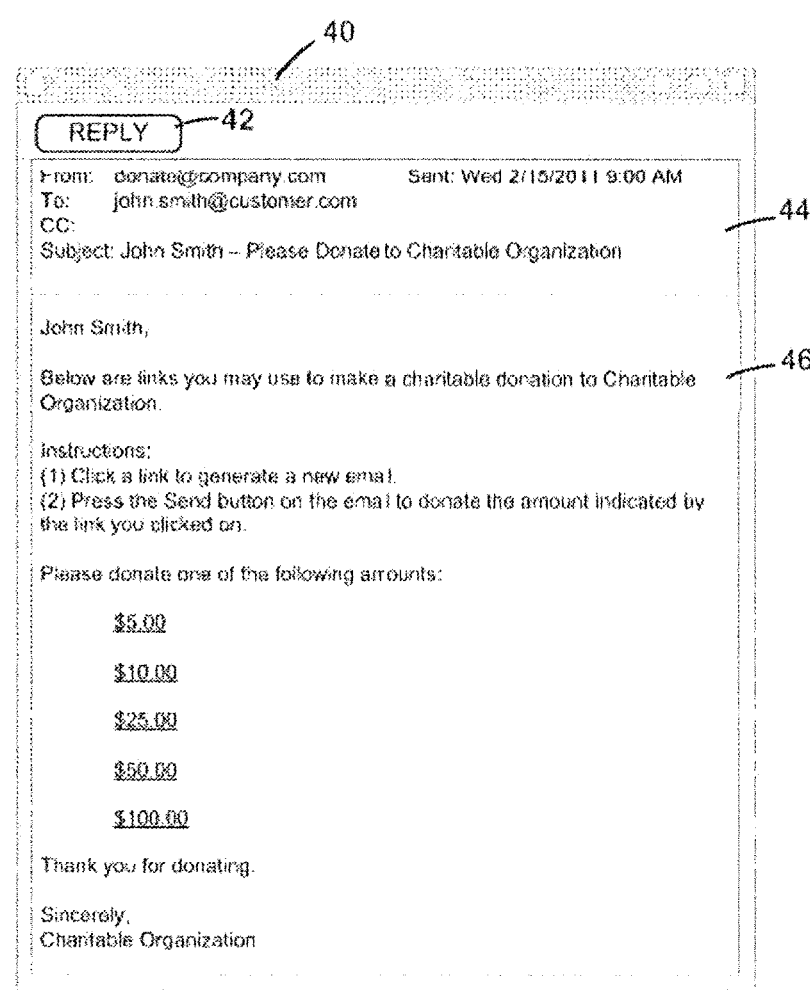
FIG. 4 illustrates an advertisement email message that solicits a donation.

FIG. 4 illustrates an advertisement email message that solicits a donation. FIG. 4 shows an email display window 40 that may be used by the email client module of customer device 150 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 2. According to the example of FIG. 4, the control area 44 shows that the sender of the message has the email address "donate@company.com." This is an email address that may be associated with an account used by the e-commerce system 140 for the communication of email messages. Further to this example, the control area 44 shows that the email address of the example recipient of the message (John Smith) is "john.smith@customer.com."

As shown in FIG. 4, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 2. The "$5.00" link describes an email message that, if received by the e-commerce system 140, will indicate to the e-commerce system 140 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 150 may receive a user input that indicates that one of the links displayed in the message body area 46 is selected. The email client module of customer device 150 may, in response to this user input, generate and display an order email message as specified by the selected link.

FIG. 5 illustrates an email message for ordering a donation. FIG. 5 shows an example message composition window 50 that may be displayed in response to a selection of a link from the message body area 46 of the email display window 40 of FIG. 3. The message composition window 50 of FIG. 5 may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 3.

FIG. 5 shows an example wherein the "$100.00" link from the message body area 46 of the email display window 40 of FIG. 4 is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 150 may send the generated order email message to the e-commerce system 140. This may be performed in response to input from a user of the customer device 150. As one example, the email client module of customer device 150 may, in response to a selection of the Send button 52 in the message composition window 50 of FIG. 5, transmit an order email message based on the contents of the fields 54, 56, 58, 60, 62 in the message composition window 50. As another example, the email client module of customer device 150 may, in response to a selection of the Send button 52 in the message composition window 50 of FIG. 5, transmit an order email message based on the contents of the display areas 54, 56, 58, 60, 62 in the message composition window 50.

As initially presented above, a token may be located within the To: Cc: or Bcc fields of a response email. This token may take the form of a short token, for example. The e-commerce system 140 may generate the short token that is located in the To: field, or any other field, for example, as part of the email address. When the vendor system 130 requests that the token generator 141 generate a mailto link with the identifiers and token, the token generator 141 may generate a "short lookup token" and the "long token" encoded with the identifiers. The short lookup token may be associated with the long token and may be required or otherwise needed to access the information in the long token index. The short token index may be sent in an email to the customer device 150 as a mailto link. The customer using the customer device 150 selects the mailto link and generates the response email addressed to the e-commerce system 140. The short lookup token may be built into the address of the response email. The short lookup token may be of the form:

payment-id-74E4DE00-51E2-457B-8C0B-
        648640EF232D@payments.atpay.com, for example.

When the customer using customer device 150 sends the email and the e-commerce system 140 receives the email and authenticates the customer's email address, the e-commerce system 140 may also determine using the short lookup token included in email address of the e-commerce system 140 the long token associated therewith. When the long token is determined, the e-commerce system 140 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

A system is described that uses the e-commerce system 140 to process emails for making payments. As shown in FIG. 1, a single payment processing system is described. The present invention's flexibility and control offers vendors a choice of which payment processor to use. Additionally, a payment processor may be a vendor and offer payments by email. Payment processors and payment gateways may integrate the e-commerce system 140 and restrict access to other payment processors and gateways.

Disclosed is an alternative to SMS carrier payments. The integration of a system that accepts multiple email addresses associated with specific transactions and the integration of a calendar program is described herein. The method may include the e-commerce system 140 receiving a request, from a vendor, for a payment request SMS message to be sent to their customers. The e-commerce system 140 processes the customer responses via SMS and authenticates the messages. The e-commerce system 140 may request the payment to be processed with a vendor determined payment processor without the aid of the carrier.

Figure 6A:
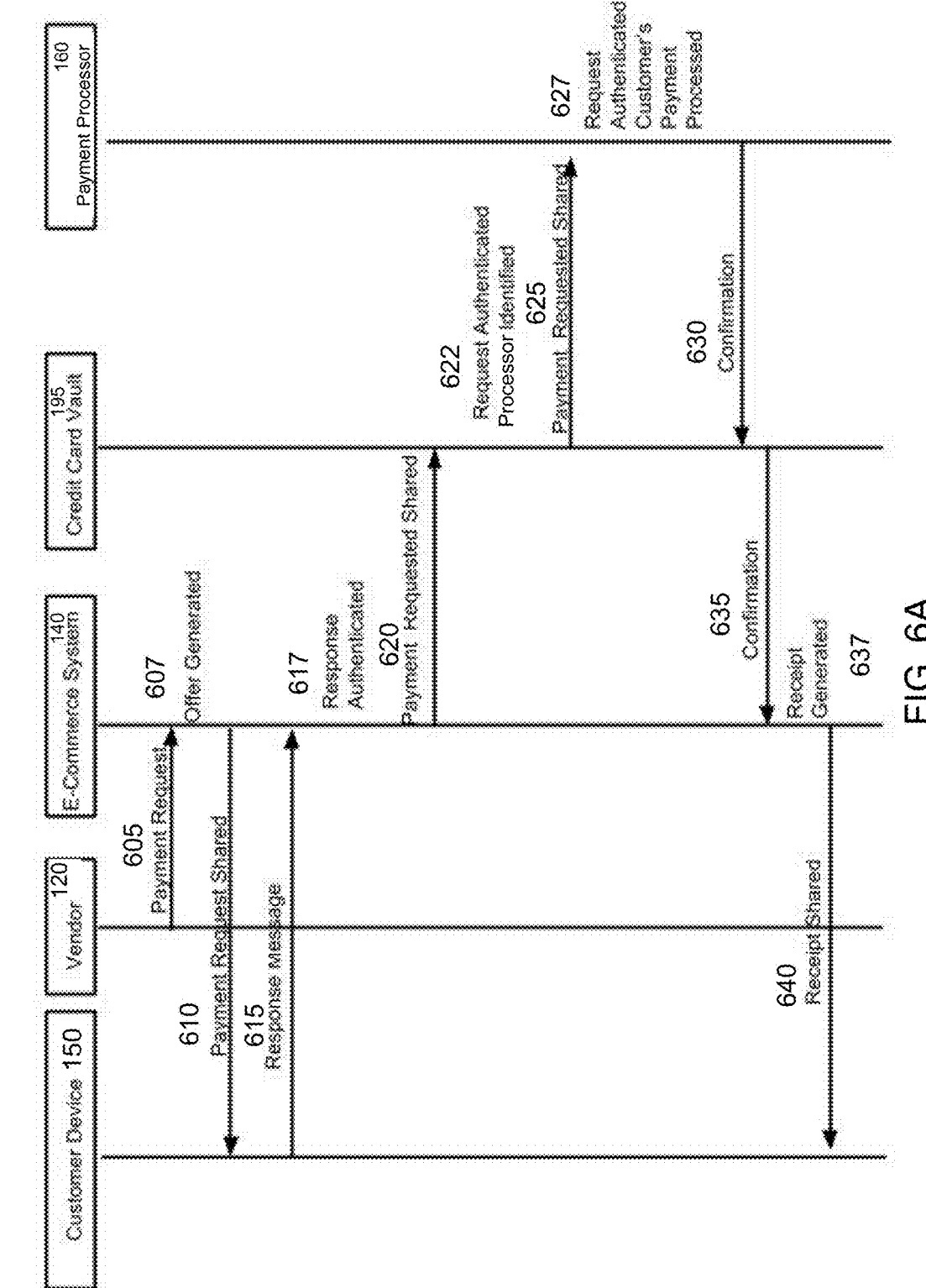
FIG. 6A is a transactional flow diagram illustrating the process for an electronic message payment with a vendor as determined payment processor.

FIG. 6A is a transactional flow diagram 600 illustrating the process for an electronic message payment with a vendor 120 as determined payment processor 160. The vendor 120 may be a retailer, non-profit, or a third party managing multiple payment platforms for multiple vendors. The vendor 120 requests a payment request message from the e-commerce system 140 at step 605. The e-commerce system 140 may generate the payment request message at step 607 and share the message via SMS, email or Social Media, at step 610, to the customer device 150 representing customers of the vendor 120. A registered customer uses customer device 150 to view the offer and may be prompted to respond if they wish to make a payment. In an example, the customer may be asked to input the word "PAY" into customer device 150. This response is sent by the customer device 150 to the e-commerce system 140 at step 615. The e-commerce system 140 receives the message and authenticates the message at step 617 through various methods including but not limited to the customer's phone number and carrier info, token, or a secret pin. If the message authenticates indicating that the customer who sent the message is registered and associated with the vendor 120, the e-commerce system 140 may generate a payment request and share this request with the credit card vault unit, or a type of debit automatic clearing house, at step 620. The credit card vault unit authenticates the request and looks up the payment requirements associated with the customer at step 622 and shares a payment request with the payment processor 160 associated with that vendor 120 and customer device 150 at step 625. The payment processor 160 authenticates the request and processes the payment at step 627. The payment processor 160 may provide a notification of the transaction to the other parties including credit card vault at step 630 and e-commerce system 140 at step 635. The e-commerce system 140 may generate a receipt at step 637. The customer may receive the e mail receipt, a link, or attached document, which may be sent by other media, for their transaction at step 640.

As an alternative or example of the above process, the message response message instead of being "PAY" may be a specific amount the customer wishes to pay, for example, "$19.95." Additionally, the credit card vault unit may be located anywhere within the system including being within one of the other systems such as payment processor 160 or e-commerce system 140, for example, or be a series of shared vaults. The credit card vault may be an automatic clearing house.

Figure 6B:
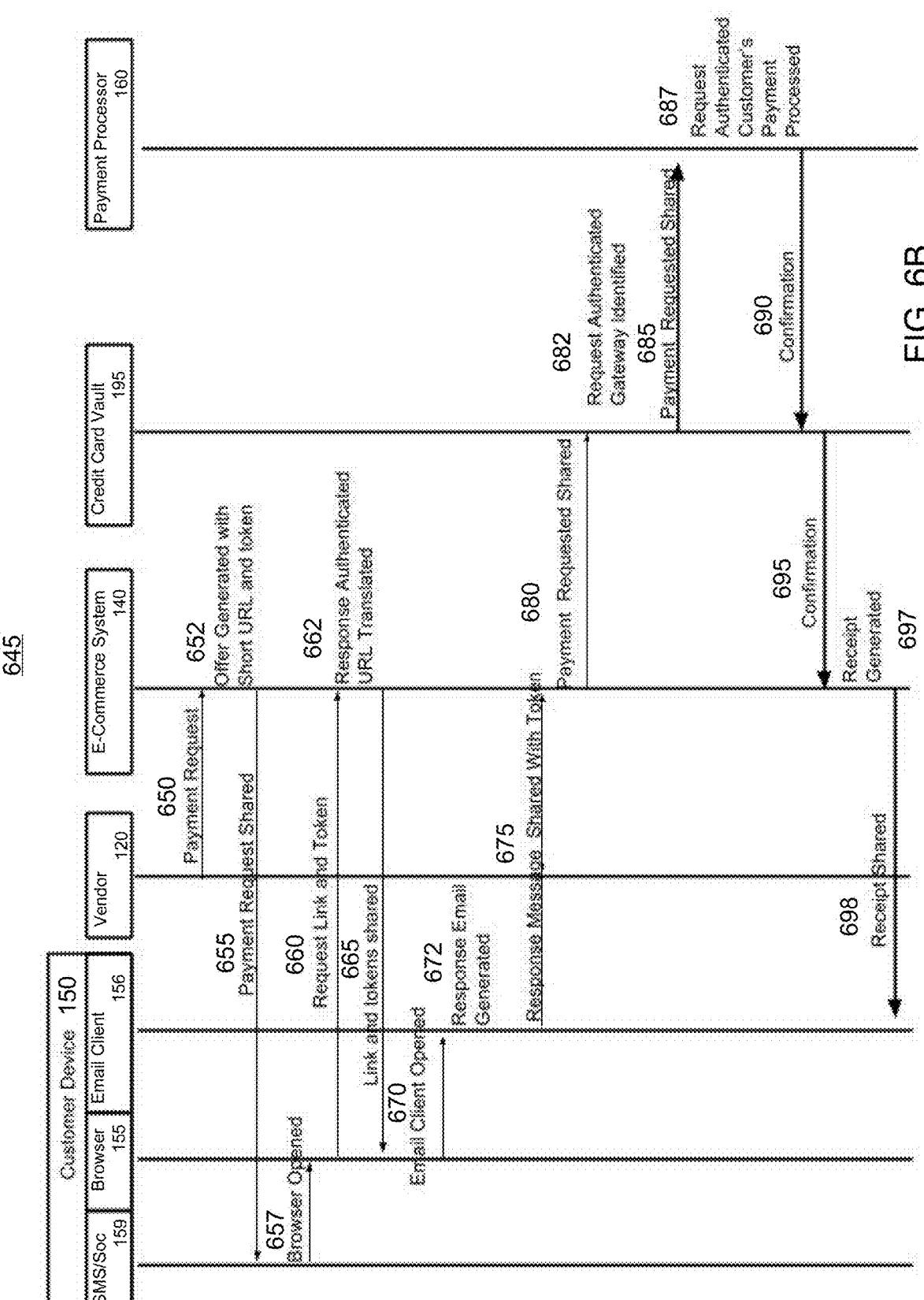
FIG. 6B is a transactional flow diagram illustrating the process for an SMS payment bypassing the carrier by using an email response with a vendor determined payment processor.

Vendors 120 wishing to offer SMS payments to their customers are often charged large fees or are required to share a large percentage of a donation or payment. FIG. 6B is a transactional flow diagram 645 illustrating the process for an SMS payment bypassing the carrier by using an email response with a vendor 120 determined payment processor 160. Carriers generally charge customer's on their phone bill. In flow 645, SMS is used to make an offer and email is used to authenticate the transaction to avoid the carrier charge. The vendor 120 may be a retailer, non-profit, or a third party managing multiple payment platforms for multiple vendors.

In flow 645, the vendor 120 requests a payment request message at step 650 from the e-commerce system 140. The e-commerce system 140 may generate a short token, long token and a short URL link associated with the transaction identified in the payment request message at step 652. The e-commerce system 140 generates a long token for each of the offers and apply a corresponding short token and short URL to each long token. The e-commerce system 140 stores the tokens and the short URL version. The e-commerce system 140 generates an SMS offer or social media post offer message with the short URL link at step 652 and shares it with the customer device 150 at step 655. There may be more than one offer and more than on link. The link maybe be embedded behind an image of a button. Alternatively, this link may be shared on a web browser, QR, barcode, application or document. The customer using customer device 150 via SMS or social media application 159 selects from multiple short URL links in the message, which selection opens web browser 155 at step 657. Web browser 155 requests the mailto link and token from the e-commerce system 140 at step 660. The e-commerce 140 system translates the URL link at step 662 and shares the corresponding mailto link and short token with browser 155 at step 665, triggering email client 156 to open. Email client 156 generates the response email with the token at step 672. The opening of the browser may not be visible to the customer. The response email may be directed to the e-commerce system 140 with the short token. The token may be located anywhere in any field of the email. The token may be the email address. The customer device 150 sends the response email to share it with the e-commerce system 140 at step 675. The e-commerce system 140 authenticates the email message. The token is also decoded. If either the authentication or the token decoding does not meet requirements, the customer device 150 may receive a response message requesting an additional confirmation or a URL link that navigates the customer to a signup page and/or checkout.

If the customer is registered and associated with the vendor 120, the e-commerce system 140 may generate a payment request and share this request with the credit card vault unit at step 680. The credit card vault unit authenticates the request and looks up the payment requirements associated with the customer at step 682. A payment request may be shared with the payment processor 160 associated with that vendor 120 and customer at step 685. The payment processor 160 authenticates the request and processes the payment at step 687. The payment processor 160 may provide a notification of the transaction to the other parties in the form of a confirmation, for example, at steps 690 and 695. A receipt may be generated by the e-commerce system 140 at step 697. The customer may receive the generated email receipt, a link, or attached document, which may be sent by other media, for their transaction at step 698.

Figure 7:
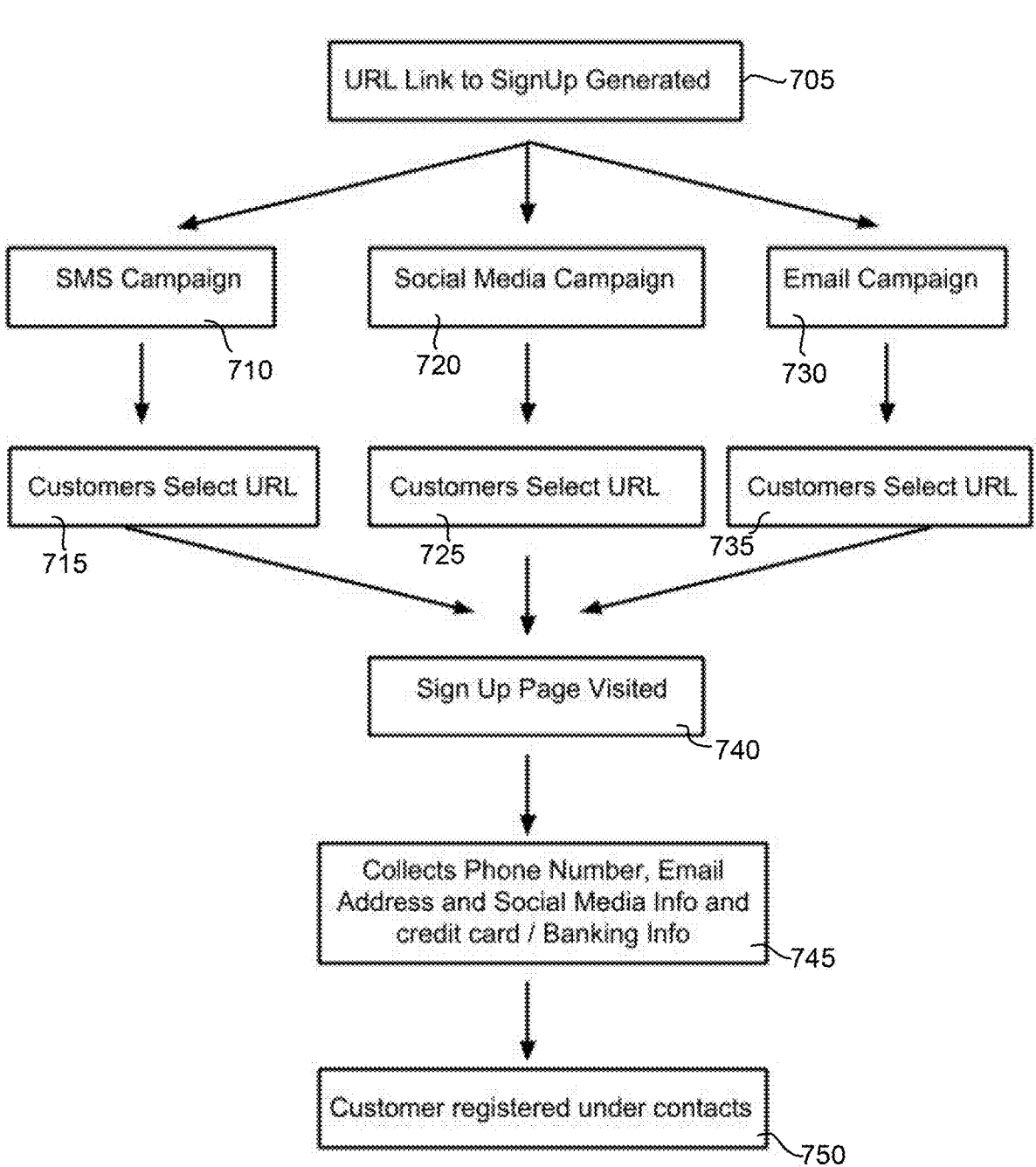
FIG. 7 illustrates a flow diagram depicting a signup process that collects the information to assist in avoiding carrier billing charges.

FIG. 7 illustrates a flow diagram 700 depicting a signup process that collects the information to assist in avoiding carrier billing charges. The ecommerce system 140 generates a web page allowing vendors to sign up customers and to register the customer with the e-commerce system 140. This sign-up page may also function to complete a transaction in a web environment. The URL of this signup page is used in various media such as SMS, email and social media. The URL link also be used in other forms such as applications, QR, barcode or documents. The e-commerce system 140 may utilize an array of media to drive a customer to a single URL sign up by generating a URL link to the signup at step 705. The URL link may be provided to a customer via an SMS campaign at step 710, via a social media campaign at step 720, and/or via an email campaign at step 730. The customer may select the URL delivered by SMS at step 715, by social media at step 725 and by email at step 735. Once the URL is selected the customer may be directed to and visit a signup page at step 740. The signup process collects required information used across multiple payment methods including collecting various addresses, phone numbers and social media handles at step 745 to allow the e-commerce system 140 to authenticate in different media for increased security. This allows the e-commerce system 140 to register the customer under contacts at step 750.

Figure 8A:
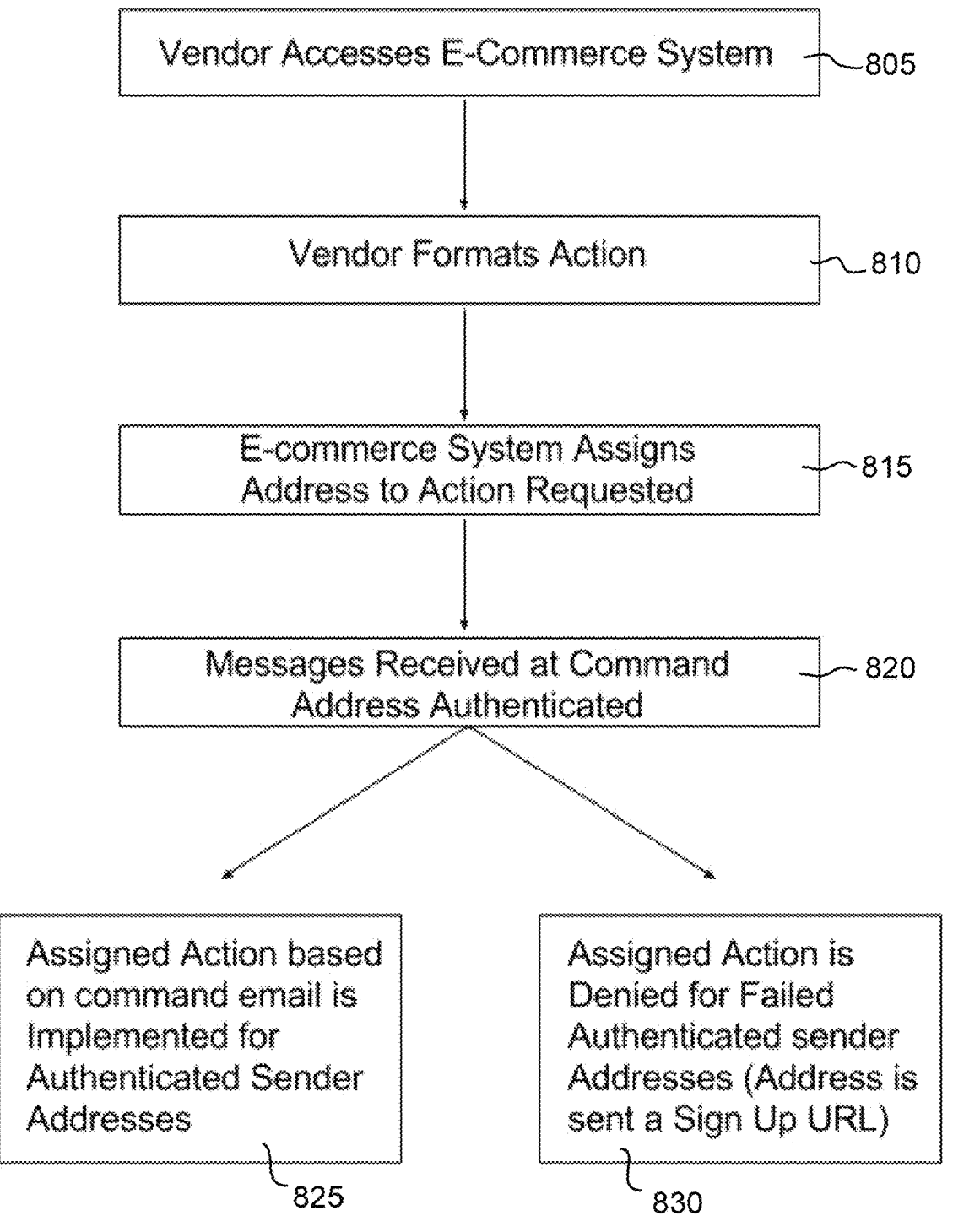
FIG. 8A is an illustration of a method depicting a vendor requesting an email address associated with a command.

FIG. 8A is an illustration of a method 800 depicting a vendor 120 requesting an email address associated with a command. When email messages arrive at the generated command address and the sender address is authenticated and recognized as registered with the e-commerce system 140, the action set by the vendor 120 is triggered. Examples of such an action is placing a charge on the customer's credit card, paying a minimum balance, or canceling a payment.

Method 800 begins with the vendor 120 using the vendor device to access the e-commerce system 140 at step 805. This may be done via a secure web interface or a direct integration with an API, for example. The vendor 120 formats the action required at step 810, such as the amount to be charged to the customer's credit card, for example. The e-commerce system 140 generates a command email address and assigns that action request to that email address at step 815. The e-commerce system 140 manages the command email address, and when the messages arrive at that address, the e-commerce system 140 authenticates the sender address at step 820. The e-commerce system 140 parses the email address based on successful authentication and where authentication failed. Assigned action based on command email is implemented for authenticated sender address at step 825. Assigned action is denied for failed authenticated sender addresses at step 830. Customers who fail authentication or are not registered with the e-commerce system 140 may be sent a Sign Up URL. The Sign up URL is an interface where information is submitted to the e-commerce system 140 and stored for future transactions.

Figure 8B:
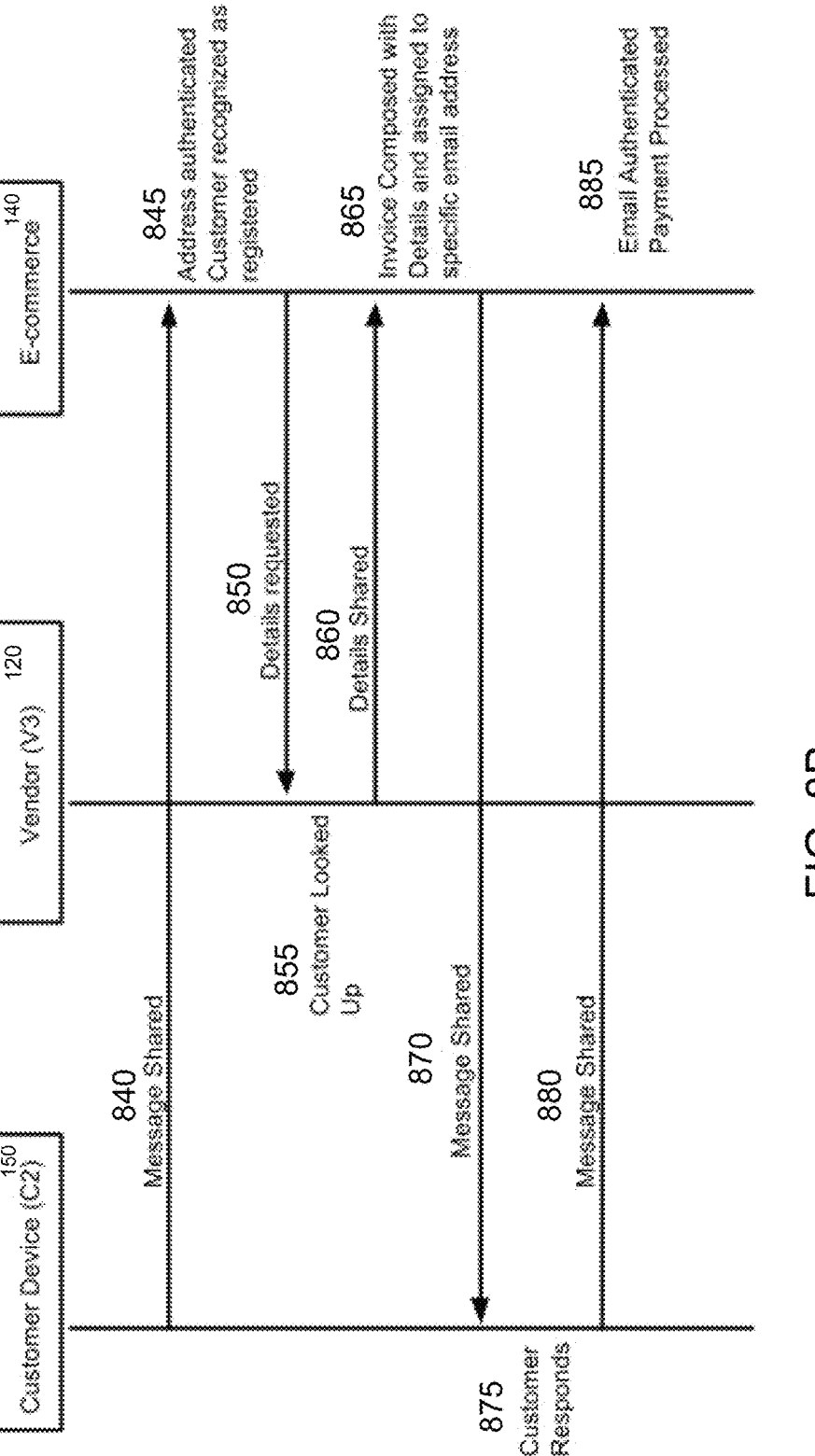
FIG. 8B is an illustration of a transactional flow diagram illustrating a processes where a customer using customer device sends a command email addressed to a destination associated with a specific assigned action.

FIG. 8B is an illustration of a transactional flow diagram 890 illustrating a processes where a customer using customer device 150 sends a command email addressed to a destination associated with a specific assigned action. This action for example may be processing a payment. A customer using customer device 150 may send an email to an advertised address of e-commerce system 140, for example, Paymybill@comcast.com, at step 840. Although in this example the destination address is an email address it may be a destination of an SMS or social media post. The customer device 150 may share a message from the customer's email account to the command email address controlled by the e-commerce system 140 at step 840. This message may be a request to be billed. The e-commerce system 140 receives and authenticates the address and recognizes the address as being associated with a registered customer at step 845. The e-commerce system 140 performs a presale hook and requests information details from the vendor 120 based on the customer's message address at step 850. The vendor 120 looks up the customer information at step 855 and shares the billing information with the e-commerce system 140 at step 860. The e-commerce system 140 may provide an invoice composed with details and assigned to the specific address at step 865.

The e-commerce system 140 sends a message with a mailto link at step 870. There may be a variety of mailto links included, each representing different responses such as 'Pay Full Amount', 'Pay Minimum Amount', 'Pay $10', or the like. Each of these commands may be associated with a different address included in the email as mailto hyperlinks, links, and telephone numbers of social media handles.

Alternatively, a mailto link may not be required in the body field of the email. The command email address may be the address of the 'reply to' setting in the email offer from the e-commerce system 140. In this example, there is a single mailto link representing one command to complete the payment.

The customer uses the customer device 150 to view the message and selects the mailto link and generates the response message at step 875. The generated message is sent to the e-commerce system 140 from the customer device 150 at step 880. The address may be different than the original address and may define the intent of the customer. For example, Paymentconfirmation@comcast.com appears to be addressed to the vendor 120 or match the original address, but is processed by the e-commerce system 140.

The e-commerce system 140 receives the message, authenticates and recognizes the address, and processes the payments at step 885. Alternatively, a token may be included in the payment request email and the response email.

Figure 9:
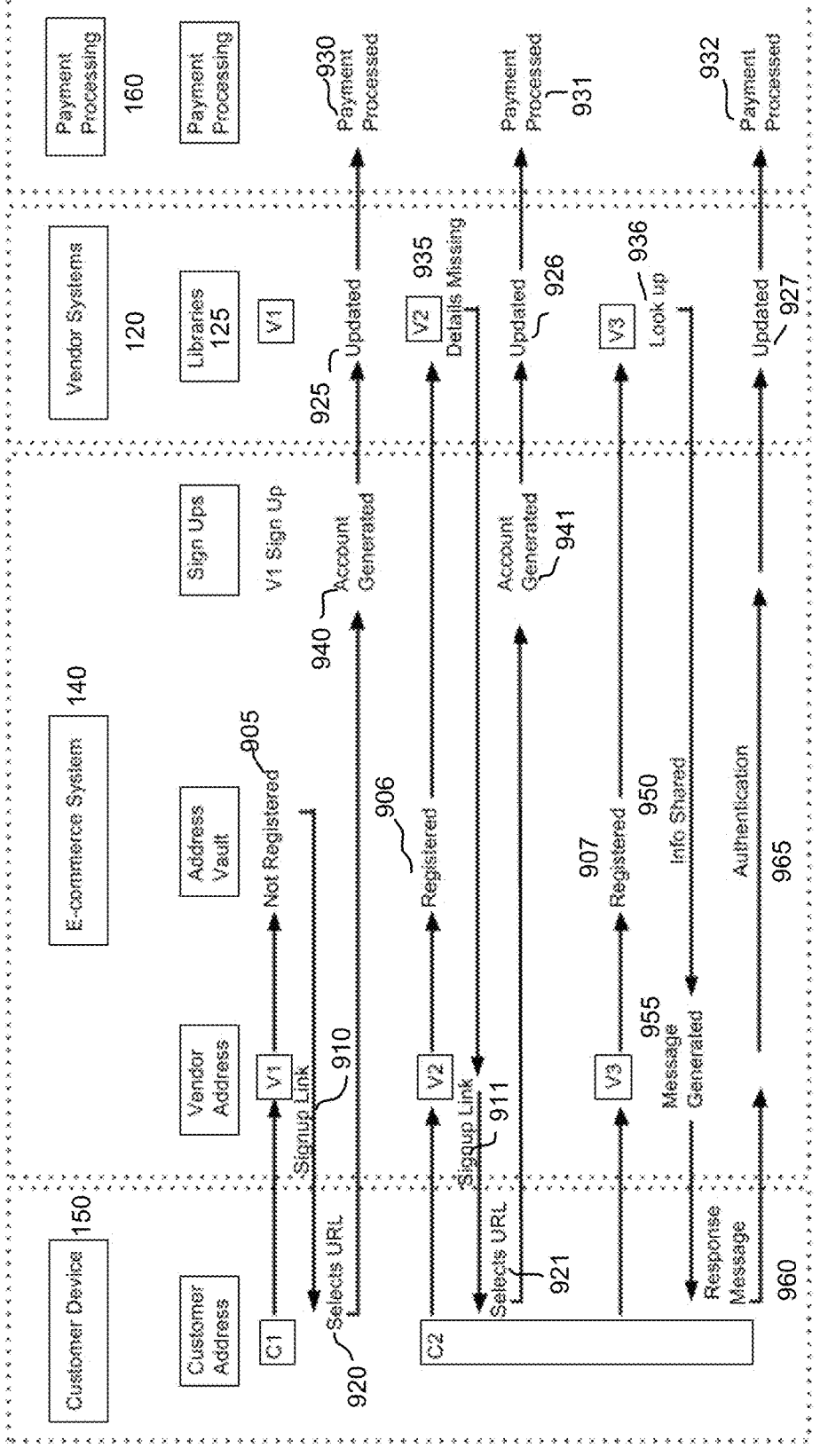
FIG. 9 is an illustration outlining different methods for the e-commerce system responding to a payment request from a customer device based on the customer's registration status with the e-commerce system and vendor.

FIG. 9 is an illustration 900 outlining different methods for the e-commerce system 140 responding to a payment request from a customer device 150 based on the customer's registration status with the e-commerce system 140 and vendor 120. The diagram illustrates three examples with two customers C1 and C2 and three vendors V1, V2 and V3. Although this example displays a limited number of customer and vendors, the system may serve any number of vendors 120 and customer device 150. Each of the three vendors is assigned three email addresses V1, V2 and V3 associated with three different actions relating to the vendor.

C1-V1 is an example where the customer's email address is not recognized as registered at 905 by the e-commerce system 140 and is navigated to a sign up 910 where customer device 150 C1 may select the URL 920 to generate an account 940 update 925 the vendor 120 V1 and checkout by processing the payment 930.

C2-V2 is an example where the customer's email is recognized as registered 906 and authenticated by the e-commerce system 140, but the email is not recognized by the vendor 120 V2 as details are missing 935 and further action is required. The customer device 150 C2 is routed to a sign up 911 where customer device 150 C2 may select the URL 921 to generate an account 941 update 926 the vendor 120 V2 and checkout by processing the payment 931. For bill payment this may only require an invoice number.

C2-V3 is an example where a customer's email is recognized as registered 907 and authenticated by the e-commerce system 140 and the vendor 120 V3 recognizes the address after looking it up 936. The information is shared 950, a message is generated by e-commerce system 140 at 955 and the customer device 150 causes a response message 960 that is authenticated 965 by the e-commerce system 140, updated 927 by the vendor system 120 V3, and the payment is processed 932 by payment processing system 160. This process (C2-V3) is described in more detail in FIG. 11.

The two C2 examples (C2-V2 and C2-V3) illustrate how one customer may have varied requirements based on vendor registration status (difference between vendor 120 V2 and vendor 120 V3). The two C2 examples illustrate that a customer may initiate payments with more than one vendor 120 but will have to register with the vendor 120 to fill-in any missing information. The e-commerce system 140 sign up may capture information and may share or restrict information based on vendor 120 requirements.

Figure 10A:
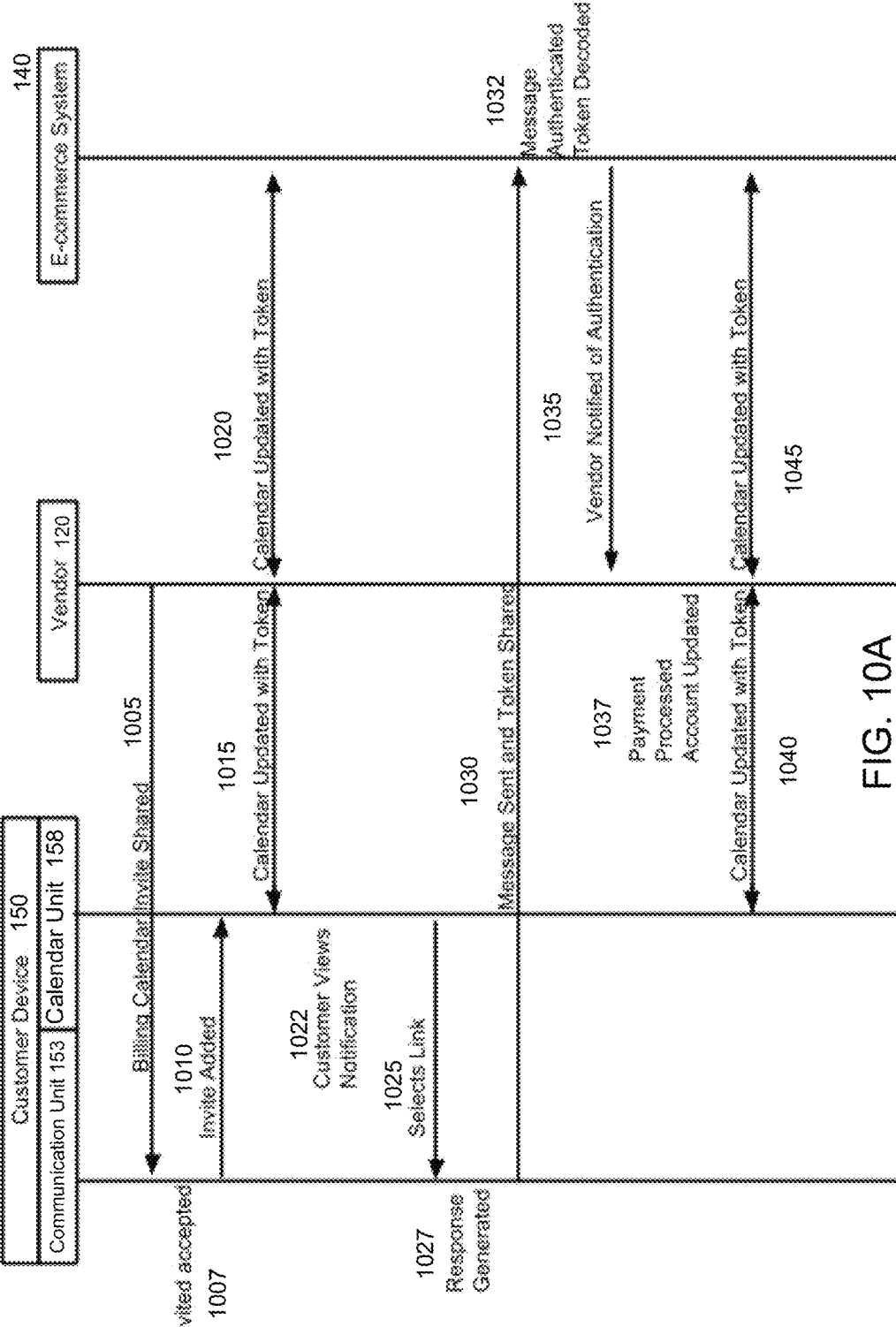
FIG. 10A is a transactional flow diagram that illustrates a process where a calendar application is integrated with the e-commerce system enabling payment messages to be generated from reminders or alerts as part of the function of the calendar application.

FIG. 10A is a transactional flow diagram 1000 that illustrates a process where a calendar application, or calendar unit 158, is integrated with the e-commerce system 140 enabling payment messages to be generated from reminders or alerts as part of the function of the calendar application 158. Registered customers may download a calendar application 158 or plugin for an existing calendar application 158 and schedule payment options by scheduling a reminder or alert. A reminder may be a notation in the 158 application, a pop up window, the generation of the message directly, or another type of alert. The reminder may include a link that when selected generates a response message to the e-commerce system confirming payment.

Figure 10B:
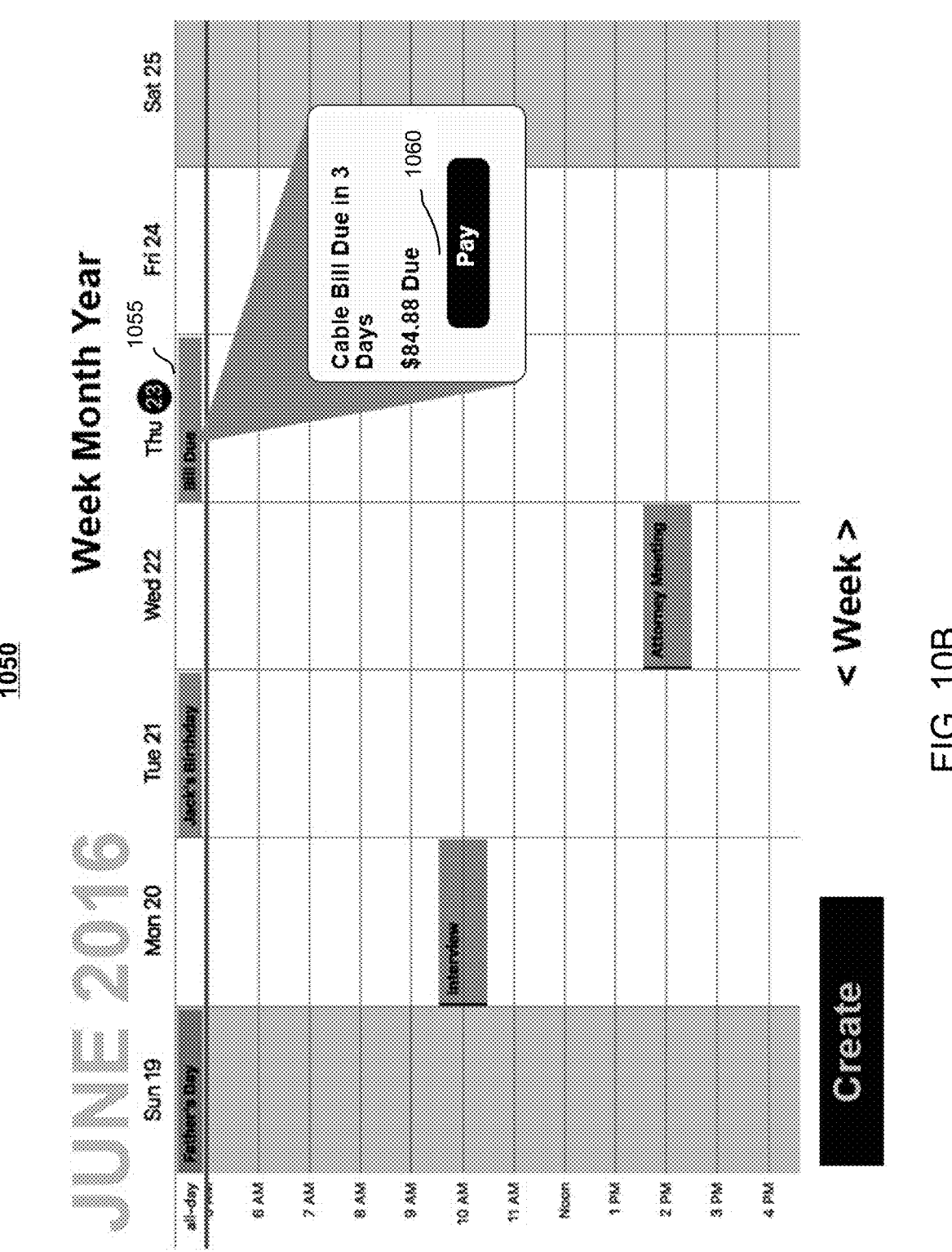
FIG. 10B illustrates an example of a calendar application.

Referring now also to FIG. 10B, there is an illustration of an example 1050 of a calendar application 158. Payment offers are scheduled to appear on the interface with a link or links 1055 which may be selected. These links may be embedded behind an image of a button. The selection of the pay button 1060 may generate a payment message. This message may be an email, SMS, or social media post. The message may hold a bulk token to pay a predetermined amount or simply signify the amount due. The example calendar application 1050 may communicate with the vendor 120 or e-commerce system 140 and provide details on the transaction, which may be included in the response email, using a token generated specifically for that transaction. The command may also be the address method described above in FIG. 8B. In place of a response message, the link may open an Email Based Web Checkout or a conventional web checkout URL.

Referring back to FIG. 10A, the vendor system 120 updates the calendar application 158 with the details of the charges to be paid by the customer to the vendor 120. The customer receives a message invite to place the reminder in their calendar application 158 or the reminder may be set automatically by the vendor 120 or e-commerce system 140 at step 1005. The invite is accepted via the communication unit 153 at step 1007 and added to the calendar application 158 on the customer device 150 at step 101. The payment details are shared and updated by the vendor 120, the customer via customer device 150, and the e-commerce system 140 at steps 1015 and 1020. The customer uses the customer device 150 to view the reminder on the calendar application 158 at step 1022, selects the link at step 1025, and the communication unit 153 generates a response message with a token at step 1027. The response message with the token is sent to the e-commerce system 140 at step 1030. The e-commerce system 140 receives the message, authenticates the email, and decodes the token at step 1032. The e-commerce system 140 sends a notification of the authentication to the vendor 120 at step 1035 and the vendor 120 processes the payment and updates the customer's account at step 1037. The e-commerce system 140 and calendar application 158 are updated at steps 1040 and 1045. Although in this example email is used, other forms of messaging may be substituted for email, such as SMS, social media, by way of non-limiting example only. The above transactions may be Simple Mail Transfer Protocol (SMTP) or Hyper-Text Transfer Protocol (HTTP) or some combination of the two. It may also utilize a web-based email checkout described in FIG. 13.

The present system and method may provide interactivity between a customer via customer device 150 and a vendor 120 via the e-commerce system 140. The e-commerce system 140 ties together multiple libraries to generate messages that use a customer device 150 to provide queries to customers allowing customers to select a response based on a category of choice. These multiple libraries may work in tandem sending multiple follow up questions until the desired choice is ascertained by the e-commerce system 140. The call and response method of communication lends itself to SMS, email and Social media messaging as described herein below.

Figure 11:
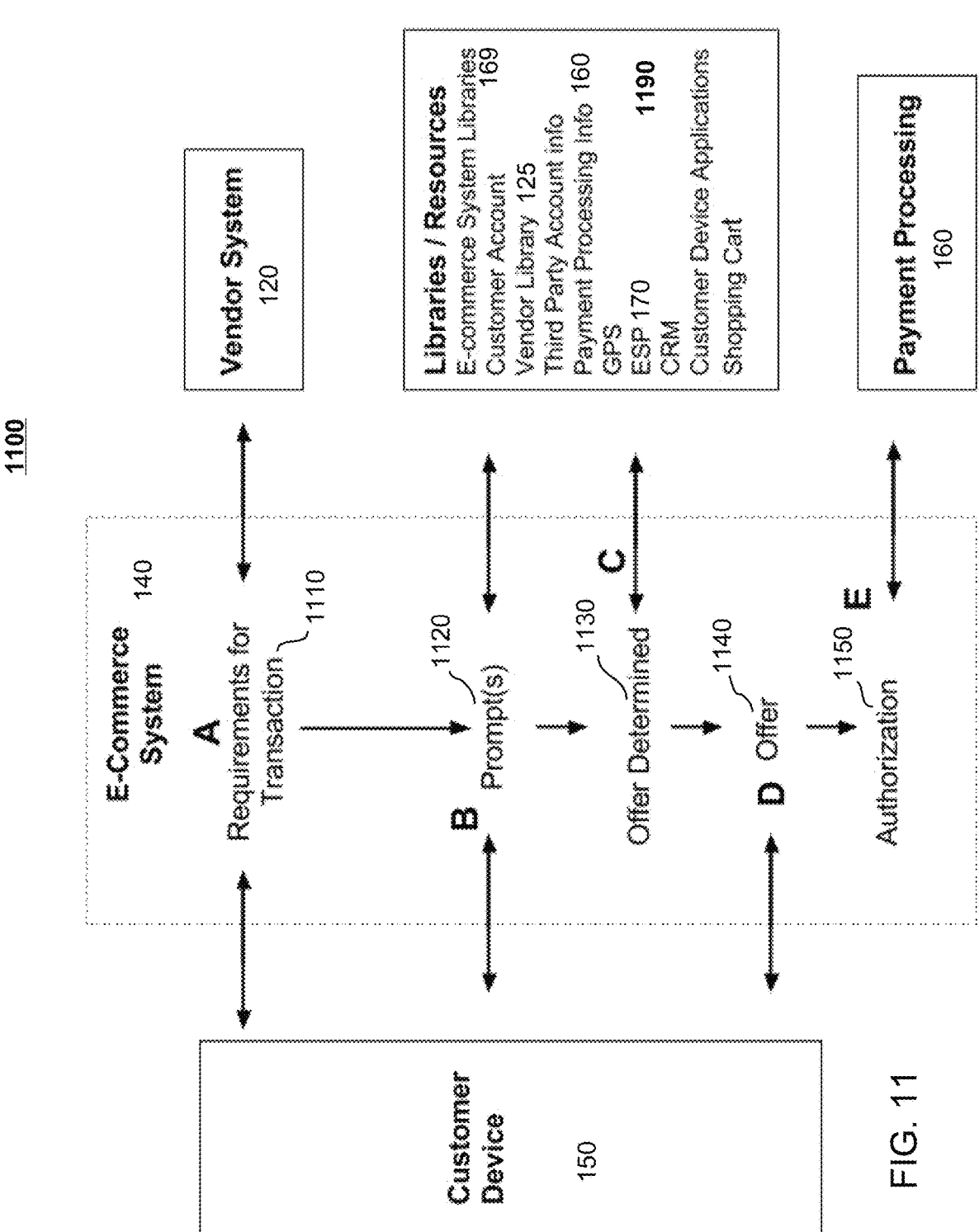
FIG. 11 illustrates a diagram depicting the process for an interactive messaging system facilitating payment.

FIG. 11 illustrates a diagram 1100 depicting the process for an interactive messaging system facilitating payment. FIG. 11 illustrates one general process by which e-commerce system 140, vendor system 120 and a customer device 150 initiate a transaction by defining the requirements to complete the transaction 1101. For example, the initiating a transaction may include generating and sending a prompt message 1120 to a registered customer via customer device 150, looking up a balance due based on an authenticated address and or authenticating an email response message. Depending of the circumstance that may be defined by the customer via customer device 150 or vendor 120, e-commerce system 140 may be configured based on those requirements. Prompts 1120 requesting responses are sent to the customer via customer device 150. For example, a first prompt may inquire if the customer wants to buy tickets. A second prompt may inquire how many tickets the customer is requesting. A third prompt may inquire what date the customer wishes to attend. Prompts 1120 may be SMS, email, social media via customer device 150 and may be verbal or based on signage or broadcasting viewed by the customer via an alternate means. Determining each prompt 1120 may require the e-commerce system 140 to pull information from a series of libraries 1190. There may be any number of libraries 1190 including library unit 169 in e-commerce system 140, library unit 125 from vendor system 120, payment processing information from payment processor 160, as well as third party accounting information, GPC, ESP 170, CRM information, customer device 150 applications and shopping carts, for example. Once the offer details are determined 1130 via the methods described above, then the offer message 1140 is sent. Offer message 1140 may require more security or may switch media as a confirmation of identity and authentication. The customer response is authenticated 1150 and the payment is processed via payment processor 160.

Figure 12:
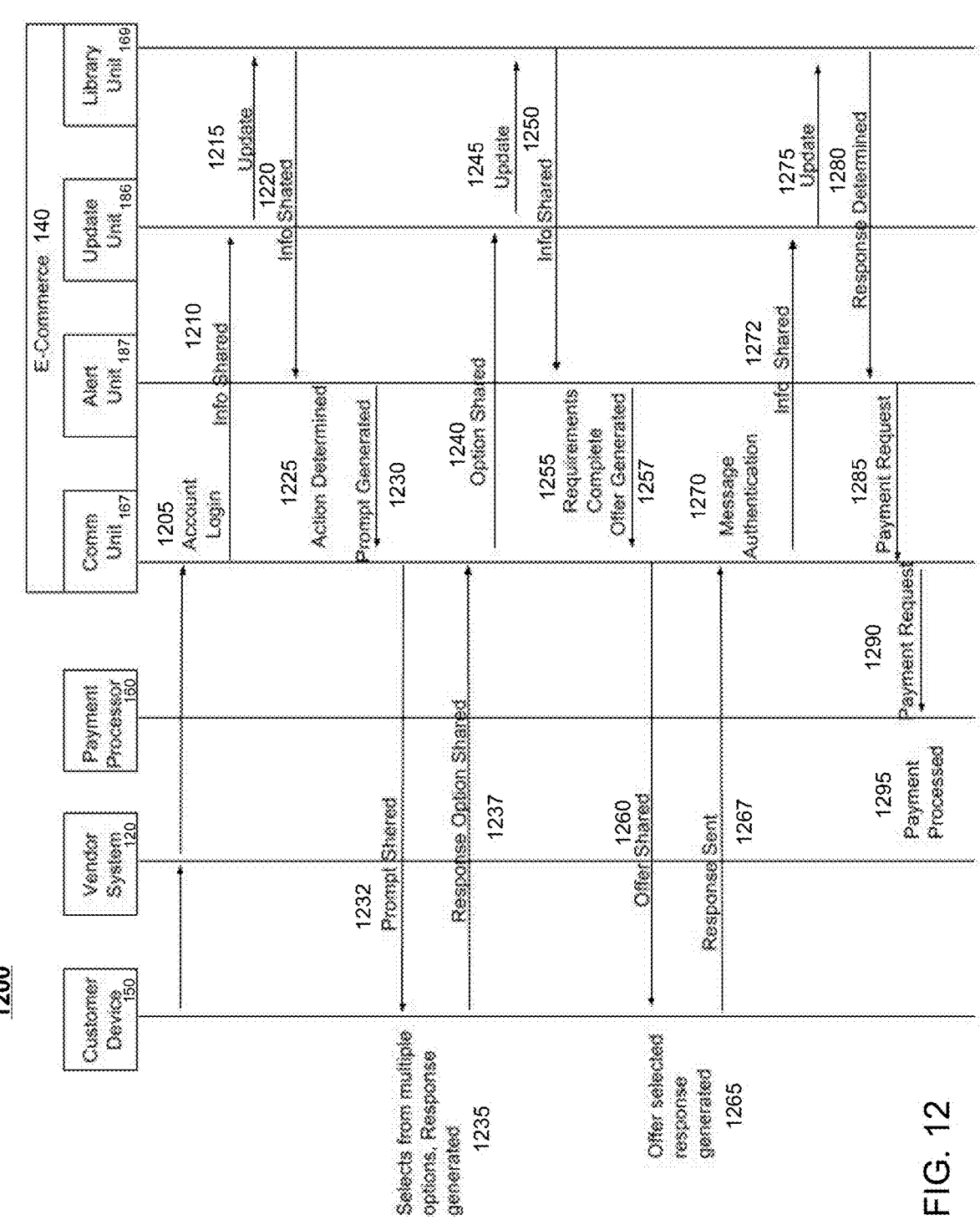
FIG. 12 is a transactional flow diagram illustrating an interactive call and response method implemented in e-commerce system.

FIG. 12 is a transactional flow diagram 1200 illustrating an interactive call and response method implemented in e-commerce system 100. Vendor 120 may be a retailer, non-profit, or a third party managing multiple payment platforms for multiple vendors. Customer via customer device 150 and vendor system 120 may access their accounts of e-commerce system 140 though the communication unit 167 at step 1205. Using the update unit 186, the customer via customer device 150 and vendor system 120 register information allowing access to their accounts at step 1210, offers to be made, and updates at step 1215 to the library unit 169 with this information. Based on the information from the library unit 169 shared to alert unit 187 at step 1220, alert unit 187 determines at step 1225 that a prompt message needs to be sent. Using the communication unit 167, the prompt message is generated at step 1230 and shared at step 1232 with the customer device 150. The prompt message may have one or more suggested responses. The prompt message may also be specific to the customer, for example, relating to a specific amount of money. The customer via customer device 150 may select from multiple options and generates a response option message at step 1235 which is shared at step 1237 with the communication unit 167. The communication unit 167 may authenticate the message and decode a token; various forms of authentication may be used. The option is shared with the update unit 186 and the library unit 169 at steps 1240 and 1245 respectively. If the requirements of the offer are incomplete, the system 140 may then determine that another prompt is sent and repeat the process until all requirements are met. Once the library unit 169 is updated at step 1245 and the alert unit 187 determines that requirements are complete at step 1255, an offer is generated at step 1257 and the communication unit 167 shares an offer message with the customer device 150 at step 1260. The customer via customer device 150 makes a selection at step 1265 and sends a response message at step

1267 to the communication unit 167. The communication unit 167 may authenticate the message or decode a token at step 1270. Various forms of authentication may be used, for example, a token may not be used at all and instead an address or phone number related to the customer may be used for authentication. As a security measure the offer message may be in one media and the response message in a separate media from the offer message. For example the offer message may be an SMS that requires a response in an email. If the response message is authenticated at step 1270, the communication unit 167 shares the offer message at step 1272 with the update unit 186. The update unit 186 shares the updated information at step 1275 with the library unit 169 determining if the requirements are met. The determination is shared with the alert unit 187 at step 1280. If requirements are not met, the customer via customer device 150 may receive a response including an additional confirmation message or a message with a Uniform Resource Locator (URL) link that navigates the customer to a signup page and/or checkout. If all requirements are met, the alert unit 187 requests the transaction be made by making a payment request at step 1285 which the communication unit 167 shares with the payment processor 160 at step 1290. The payment processor 160 charges the credit card or bank account and processes the payment at step 1295.

Figure 13:
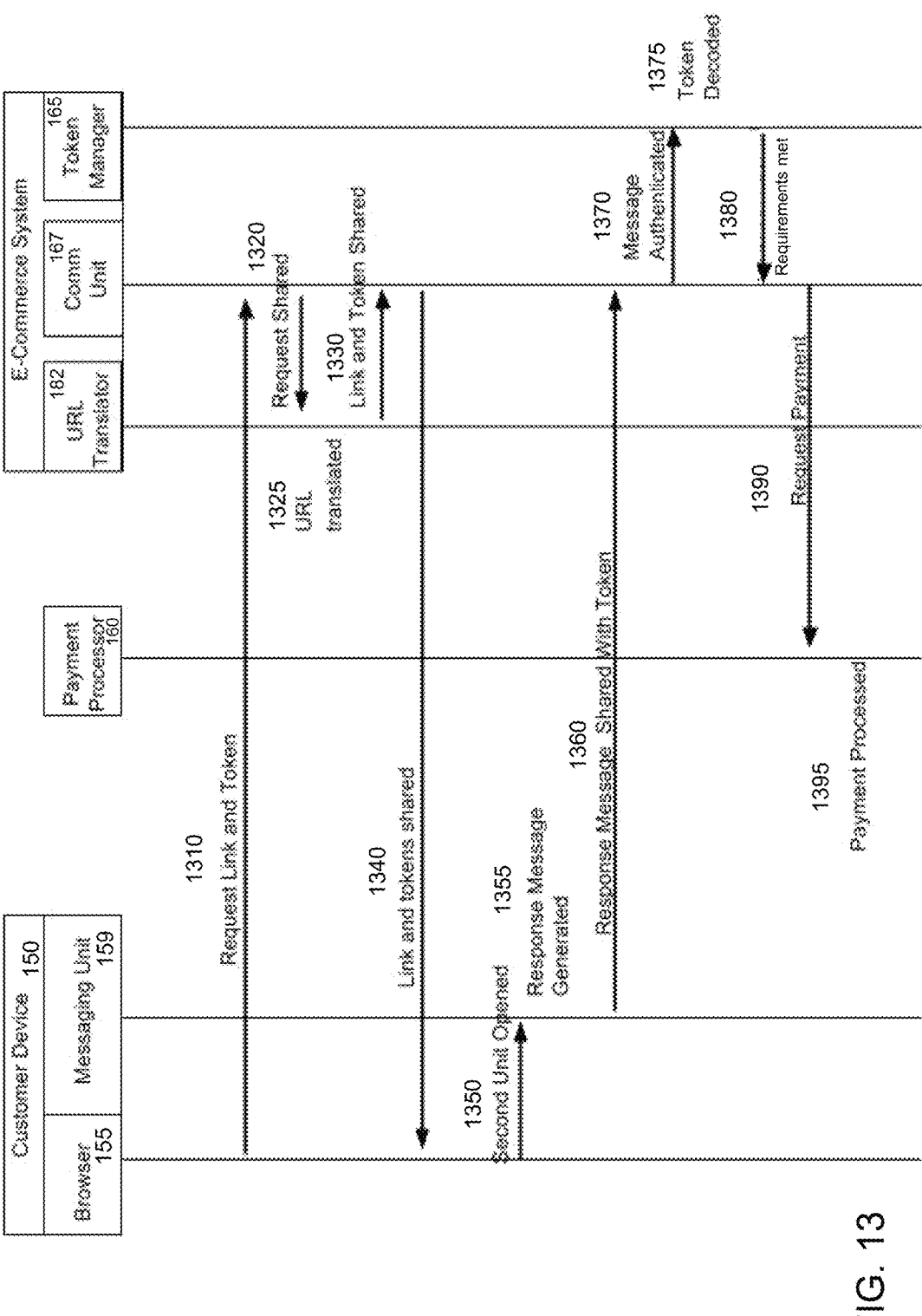
FIG. 13 is a transactional flow diagram illustrating the use of a short URL with token authentication in e-commerce system.

FIG. 13 is a transactional flow diagram 1300 illustrating the use of a short URL with token authentication in e-commerce system 100. In the depicted embodiment, a web browser 155 is utilized by the customer to request a link at step 1310 that triggers a message to confirm payment. Various prompts might trigger the web browser 155 to request the link from the e-commerce system 140. For example the customer may select a URL link in another application that opens the web browser 155 or alternatively the customer may be in a web-based checkout where the customer selects the link that then opens the web browser 155. Opening the web browser 155 triggers a request from communication unit 167 for a mailto link and token at step 1310. The request may be a series of requests or require the e-commerce system 140 to tally an amount due of the customer. E-commerce system 140 may also require a look up of other required information. The communication unit 167 shares the request with the URL translator 182 at step 1320. The URL translator 182 translates the URL link at step 1325 and shares the corresponding link and token with the communication unit 167 at step 1330. This token may be a short token that corresponds to a longer token. The communication unit 167 shares the link and token with the browser 155 at step 1340, triggering the messaging unit 159 at step 1350 to generate the response message with the token at step 1355. The opening of the browser 155 may not be visible to the customer on customer device 150. The response message is addressed and sent to the e-commerce system 140 communication unit 167 with the token at step 1360. The token may be located anywhere in any field of the message. The communication unit 167 authenticates the message at step 1370 and shares the token with the token manager 165 to decode the token at step 1375. If the token is a short token, it may need to be matched with a corresponding long token. The long token may require additional decoding (not shown). If either the authentication or the token decoding does not meet requirements, the customer via customer device 150 may receive a response message requesting an additional confirmation or a URL link that navigates the customer device 150 to a signup page and/or checkout. If all requirements are met, the token manager 165 notifies the communication unit 167 that requirements are met at step 1380. The communication unit 167 requests payment at step 1390 with the payment processor 160. The payment is processed at step 1395, and updates and notifications are sent.

Figure 14:
FIG. 14 is a diagram illustrating a tiered response for interaction in the present system.

FIG. 14 is a diagram 1400 illustrating a tiered response for an interaction in the present system 100. A first portion 1410 identifies all of the possible versions of the outcome based on the message prompts formed from the customer/vendor criteria. Underneath first portion 1410 are levels or tiers of the available outcomes from the prompts. In tier 1420, the three choices for selection of prompt 1 are shown. As shown in the example, three choices are available—A, B, C.

In tier 1430, there are three choices for prompt 2. These choices are shown combined with the choices from tier 1 1420. As shown in the example, three choices are available—1, 2, 3. When combined with the three choices from tier 1 1420, the example provides nine choices or pairings. Three choices grouped based on choice A in tier 1 1420—A1, A2, A3. Three choices grouped based on choice B in tier 1 1420—B1, B2, B3. Three choices grouped based on choice C in tier 1 1420—C1, C2, C3.

In tier 1440, there are three choices for prompt 3. These choices are shown combined with the choices for tiers 1 (1420) and 2 (1430). As shown in the depicted example, three choices are available—a, b, c. When combined with the three choices from tier 1 1420 and the three choices from tier 2 1430, the example provides 27 choices or pairings. These choices may be groped based on the groupings from tier 2 1430—A1, A2, A3, B1, B2, B3, C1, C2, C3. This provides three outcomes 1440A1—A1*a*, A1*b*, A1*c*, three outcomes 1440A2—A2*a*, A2*b*, A2*c*, three outcomes 1440A3—A3*a*, A3*b*, A3*c*, three outcomes 1440B1—B1*a*, B1*b*, B1*c*, three outcomes 1440B2—B2*a*, B2*b*, B2*c*, three outcomes 1440B3—B3*a*, B3*b*, B3*c*, three outcomes 1440C1—C1*a*, C1*b*, C1*c*, three outcomes 1440C2—C2*a*, C2*b*, C2*c*, and three outcomes 1440C3—C3*a*, C3*b*, C3*c*. This represents all of the available combinations of the choices for prompts 1, 2, 3. While the example includes three choices for each prompt and three prompts, these amounts are provided only for the ease of understanding while any number of prompts and choices within the prompts may be used. This variation includes using different numbers of choices for different ones of the prompts, for example. Different numbers of prompts may also be applied.

In this example, the selected option 1450, such as via customer device 150, is option B3*c*. A payment may be processed based on the selection of option 1450.

As shown in FIG. 14, each tier, 1420, 1430, 1440 provides a set of prompts (selections) that aid in determining the customer's desired selection. As an example, if tickets are being sold, prompt 1 1420—A, B, or C—may represent three different events for which tickets may be purchased. Prompt 2 1430-1, 2 or 3—may represent a quantity of tickets that are desired to be purchased, and prompt 3 1440—a, b, or c—may represent distinct times for the event. In this example, first portion 1410 may include all possible combination of different events, quantity of tickets, and times for the event. Although ticket sales serves as an example any range of product, service or donation may be substituted.

The present system and method may utilize the interactive features of the e-commerce system 140 to access customer's online shopping cart lists. The e-commerce system 140 may be linked to a variety of vendor shopping cart libraries and aggregate those selections to offer responses to questions that aid customers in narrowing their choices in order to make purchases. Customers, using customer device 150, through a variety of messaging such as SMS, social media and email, are eventually offered a chance to checkout. Offer messages are composed based on the settings determined by the vendor 120, the customer, or the e-commerce system 140. For example, if a customer abandons a shopping cart with items not purchased, the e-commerce system 140 may send offers based on the contents of the abandoned cart. Alternatively, the e-commerce system 140 may use a predictive method based on what customers have purchased, estimating when a supply runs low based on average consumption or past frequency of purchased or related items to recommend actions to the customer. Although an online shopping cart is used as an example in the descriptions of FIGS. 15-19, shopping carts may be replaced with any type of library of customer information, such as wedding registries, wish lists, or customer activity information.

Figure 15:
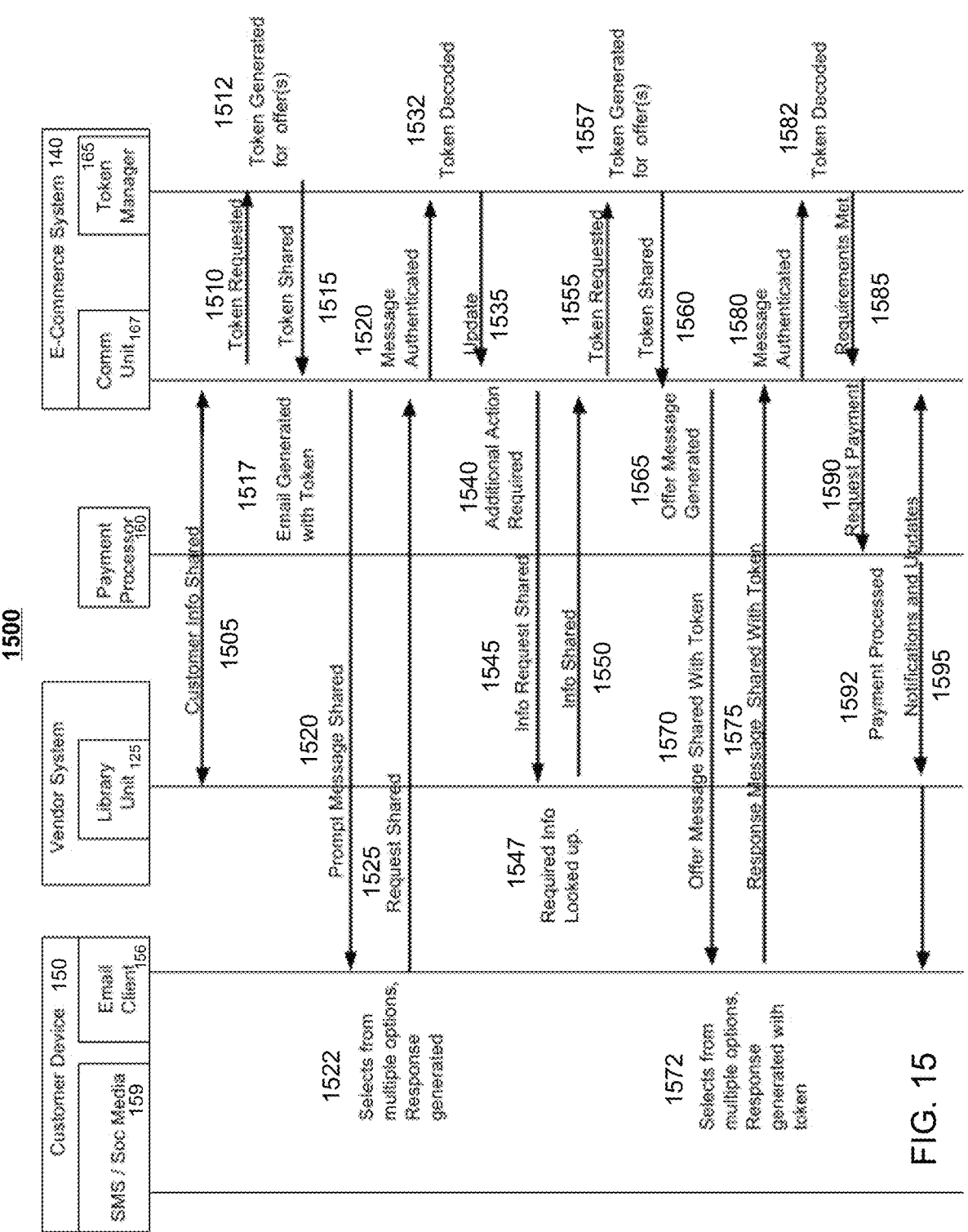
FIG. 15 is a transactional flow diagram illustrating a method where the e-commerce system accesses a vendor library of customer shopping cart activity to message a series of choices to offer an email based checkout.

FIG. 15 is a transactional flow diagram 1500 illustrating a method where the e-commerce system 140 accesses a vendor library 125 of customer shopping cart activity to message a series of choices to offer an email based checkout. The vendor via vendor system 120 registers with the e-commerce system 140 and shares customer information with the e-commerce system 140 at step 1505. The vendor system library 125 periodically updates the e-commerce system 140, sharing customer information with the communication unit 167 at step 1505. The communication unit 167 determines the required prompts to be sent and requests a token based on the prompts to be proposed to customers at step 1510. The communication unit 167 shares the request for tokens with the token manager 165 and the token manager generates the tokens at step 1512 and shares them with the communication unit 167 at step 1515. The token may be included within a mailto link. The communication unit 167 generates the prompt email with the mailto link and token at step 1517 and shares the message with the customer device 150 at step 1520. The customer views the message using the email client 156 and selects a mailto link, generating a response request message at step 1522. The message is sent and shared with the e-commerce system 140 using the communication unit 167 at step 1525. The communication unit 167 authenticates the email at step 1530 and shares the token with the token manager 165. The token is decoded by the token manager 165 at step 1532 and communication unit 167 is updated at step 1535 to determine if further information is required at step 1540. A token may not be necessary to complete the transaction, alternatively only an email address may be required, for example, a specific address reserved only for that response, as described in FIGS. 8A, 8B and 9 hereinabove. The communication unit 167 may request additional information from the vendor library unit 125 at step 1545. The required information retrieved from the vendor library unit 125 at step 1547 and the information is shared with the communication unit 167 at step 1550. Although the vendor library unit 125 is located in the vendor system 120 this library may be located elsewhere with system 100. Although in this example only one prompt is sent at step 1520, the selection process may require a series of updates with the vendor 120, prompts with the customer via customer device 150, or no prompts.

The information shared with the communication unit 167 forms the basis of the offers. The communication unit 167 shares the request with the token manager 165 at step 1555. The required token(s) are generated by the token manager 165 at step 1557 and shared with the communication unit 167 at step 1560. The communication unit 167 generates the offer email with mailto links and tokens at step 1565, and shares the message with the customer device 150 at step 1570. The customer via customer device 150 views the email offers on the email client 156 and selects one of the mailto links to make a purchase at step 1572. This mailto link may be embedded behind an image. The mailto link generates a response email that has the token and is addressed to the e-commerce system. The customer device 150 sends the email at step 1575 and shares the message with the communication unit 167. The message is authenticated at step 1580 by the communication unit 167 and the token is shared with the token manager 165. The token manager 165 decodes the token at step 1582. If either the authentication or the token decoding does not meet requirements, the customer may receive a response message via customer device 150 requesting an additional confirmation or a URL link that navigates the customer to a signup page and/or checkout. If all requirements are met at step 1585, the token manager 165 updates the communications unit 167 and the communications unit shares a payment request with the payment processor 160 at step 1590. The payment is then processed at step 1592 and notifications and updates are shared at step 1595.

Figure 16:
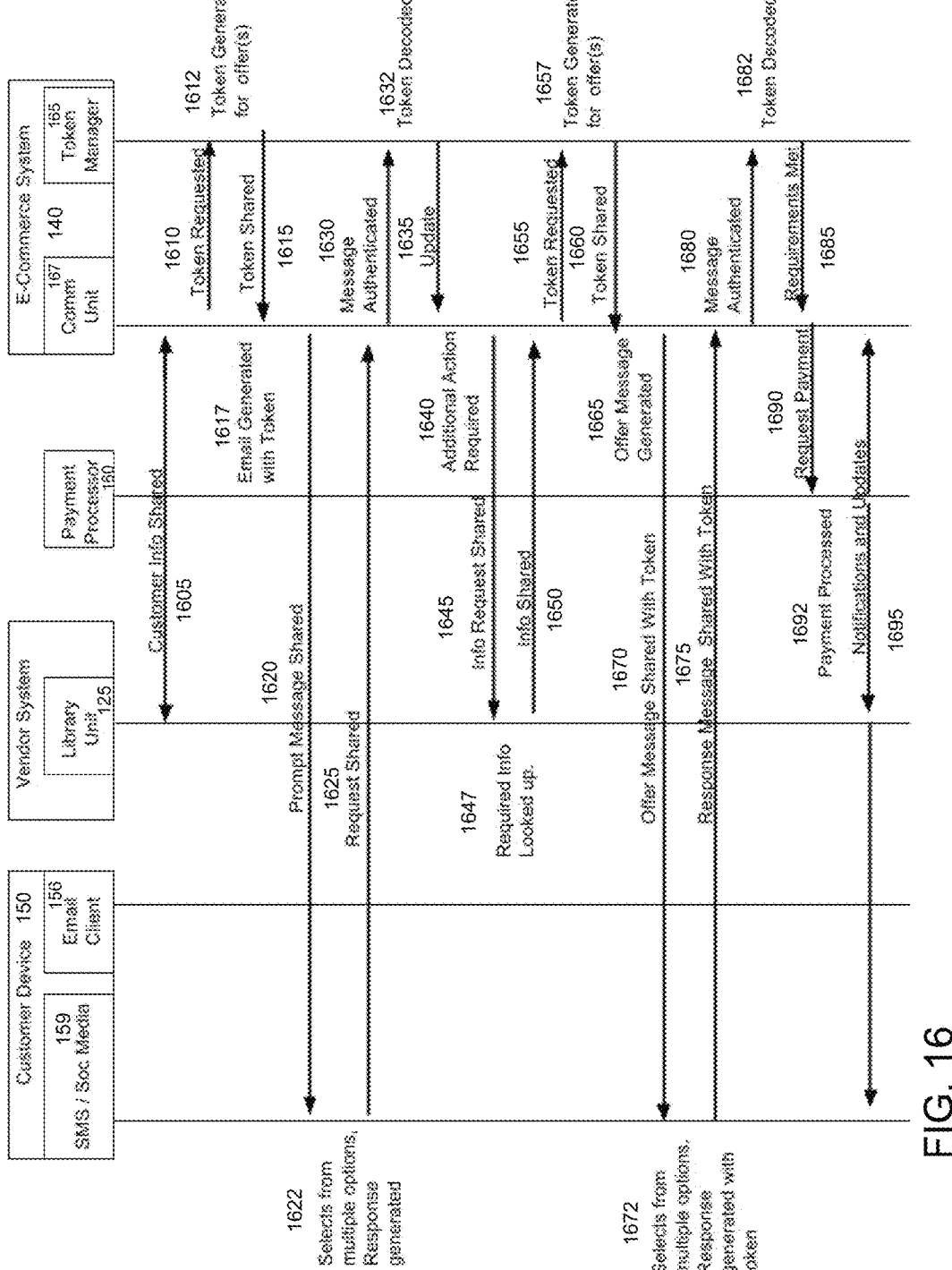
FIG. 16 is a transactional flow diagram illustrating a method where the e-commerce system accesses a vendor library of customer shopping cart activity to message a series of choices to the customer and based on customer responses offer a SMS or social media based checkout.

FIG. 16 is a transactional flow diagram 1600 illustrating a method where the e-commerce system 140 accesses a vendor library 125 of customer shopping cart activity to message a series of choices to the customer and based on customer responses offer a SMS or social media based checkout. The vendor via vendor system 120 registers with the e-commerce system 140 and shares customer information with the e-commerce system 140 at step 1605. The vendor system library 125 periodically updates the e-commerce system 140, sharing customer information with the communication unit 167 at step 1605. The communication unit 167 determines the required prompts to be sent and requests a token based on the prompts to be proposed to customers at step 1610. The communication unit 167 shares the request for tokens with the token manager 165 and the token manager generates the tokens at step 1612 and shares them with the communication unit 167 at step 1615. The communication unit 167 generates the prompt SMS or social media post at step 1617 and shares the message with the customer device 150 at step 1620. The customer views the message using the SMS or social media application 159 and makes a selection, generating a response request message at step 1622. The message is sent and shared with the e-commerce system 140 using the communication unit 167 at step 1625. The communication unit 167 authenticates the email at step 1630 and shares the token with the token manager 165. The token is decoded by the token manager 165 at step 1632 and communication unit 167 is updated at step 1635 to determine if further information is required at step 1640. A token may not be necessary only an email address. The communication unit 167 may request additional information from the vendor library unit 125 at step 1645. The required information retrieved from the vendor library unit 125 at step 1647 and the information is shared with the communication unit 167 at step 1650. Although the vendor library unit 125 is located in the vendor system 120 this library may be located elsewhere with system 100. Although in this example only one prompt is sent at step 1620, the selection process may require a series of updates with the vendor 120, prompts with the customer via customer device 150, or no prompts.

The information shared with the communication unit 167 forms the basis of the offers. The communication unit 167 shares the request with the token manager 165 at step 1655. The required token(s) are generated by the token manager 165 at step 1657 and shared with the communication unit 167 at step 1660. The communication unit 167 generates the offer using SMS or social media post with tokens at step 1665, and shares them with the customer device 150 at step 1670. The customer via customer device 150 views the SMS or social media offer using SMS or social media application 159, makes a selection, and generates a response message addressed to the e-commerce system including the token at step 1672. The customer device 150 sends the SMS or social media post at step 1675 and shares the response message with the communication unit 167. The response message is authenticated at step 1680 by the communication unit 167 and the token is shared with the token manager 165. The token manager 165 decodes the token at step 1682. If either the authentication or the token decoding does not meet requirements, the customer may receive a response message via customer device 150 requesting an additional confirmation or a URL link that navigates the customer to a signup page and/or checkout. If all requirements are met at step 1685, the token manager 165 updates the communications unit 167 and the communications unit shares a payment request with the payment processor 160 at step 1690. The payment is then processed at step 1692 and notifications and updates are shared at step 1695.

Figure 17:
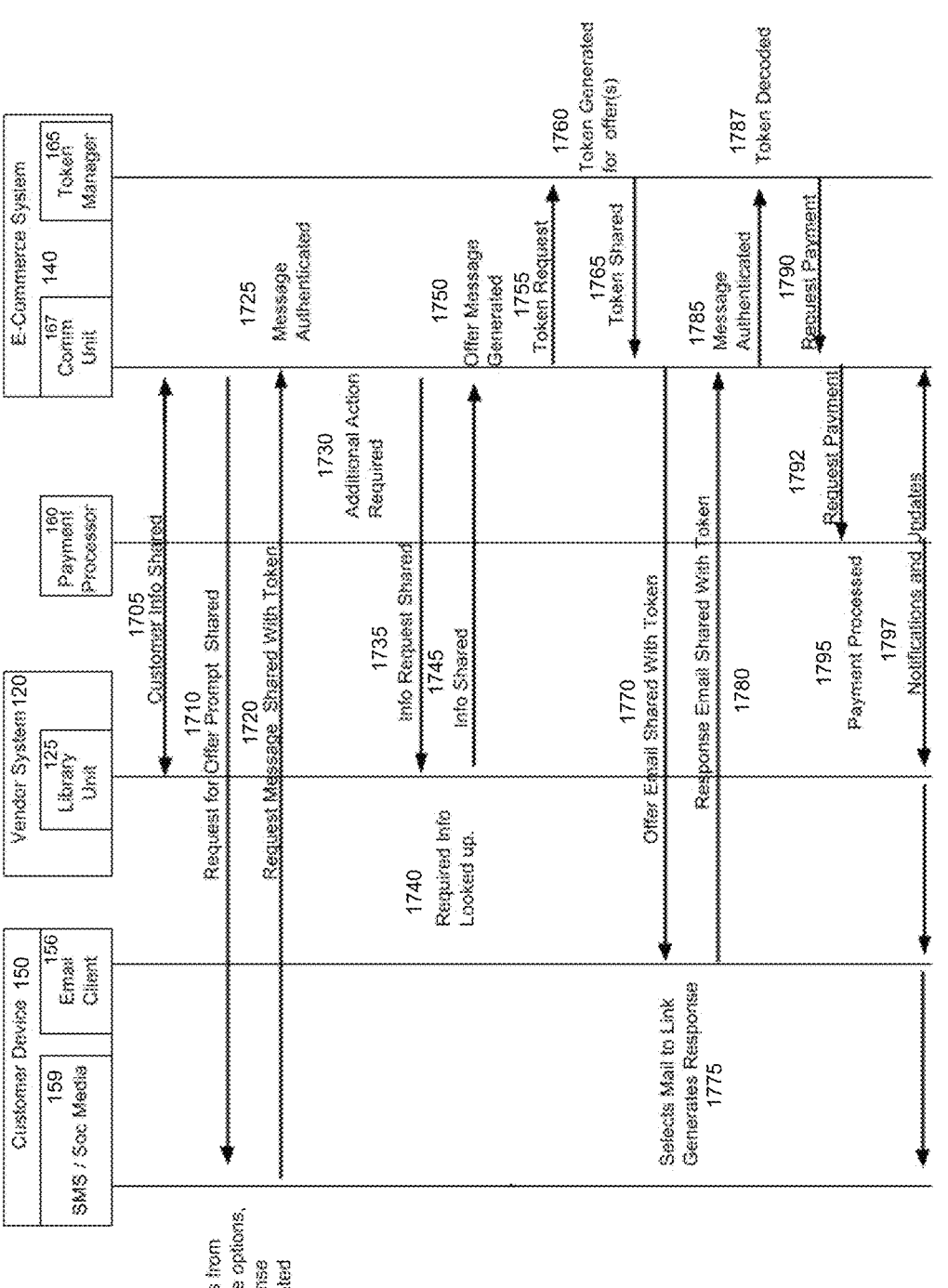
FIG. 17 is a transactional flow diagram illustrating a method where the e-commerce system may access a vendor library of customer shopping cart activity to message a series of choices to the customer device via SMS and social media and based on customer responses offer a an email-based checkout.

FIG. 17 is a transactional flow diagram 1700 illustrating a method where the e-commerce system 140 may access a vendor library 125 of customer shopping cart activity to message a series of choices to the customer device 150 via SMS and social media and based on customer responses offer a an email-based checkout. The vendor 120 registers with the e-commerce system and shares customer information with the e-commerce system 140 at step 1705. The vendor system library 125 periodically updates the e-commerce system, sharing customer information with the communication unit 167 at step 1705. The communication unit 167 determines the required prompts. The communication unit 167 generates the SMS or social media prompt and shares the message with the customer device 150 at step 1710. The customer views the message using the SMS or Social Media application 159 on customer device 150, makes a selection, and generates a response request message at step 1715. The response may take many forms such as a word, a quantity, a secret pin, a token, by way of nonlimiting examples only. The response request message is addressed to the e-commerce system 140 and is sent and shared with the communication unit 167 at step 1720. The communication unit 167 authenticates the SMS or social media posting at step 1725, shares the SMS or social media posting, and determines if further information is required at step 1730. The communication unit 167 requests additional information at step 1730 from the vendor library unit 125 at step 1735. The required information queried by the vendor library unit 125 at step 1740 and the information is shared with the communication unit 167 at step 1745. Although the vendor library unit 125 is located in the vendor system 120 this library may be located elsewhere. Although in this example only a single prompt is sent, the selection process may require a series of updates with the vendor 120, prompts with the customer device 150, or no prompts.

The information shared with the communication unit 167 forms the basis of the offers at step 1750. The communication unit 167 shares the request with the token manager 165 at step 1755. The tokens are generated by the token manager 165 at step 1760 and shared with the communication unit 167 at step 1765. The communication unit 167 generates the offer email with mailto links and tokens and shares them with the customer device 150 at step 1770. The customer views the email offers on the email client 156 and selects one of the mailto links to make a purchase at step 1775. This mailto link may be embedded behind an image. The mailto link generates a response email that has the token and is addressed to the e-commerce system 140. The email is sent at step 178—to the communication unit 167. The message is authenticated by the communication unit 167 at step 1785 and the token is shared with token manager 165. The token manager 165 decodes the token at step 1787. If either the authentication or the token decoding does not meet requirements, the customer via customer device 150 may receive a response message requesting an additional confirmation or a URL link that navigates the customer to a signup page and/or checkout. If all requirements are met the token manager 165 updates the communications unit 167 at step 1790 and the communications unit 167 shares a payment request with the payment processor 160 at step 1792. The payment is then processed at step 1795 and notifications and updates are shared at step 1797.

Figure 18A:
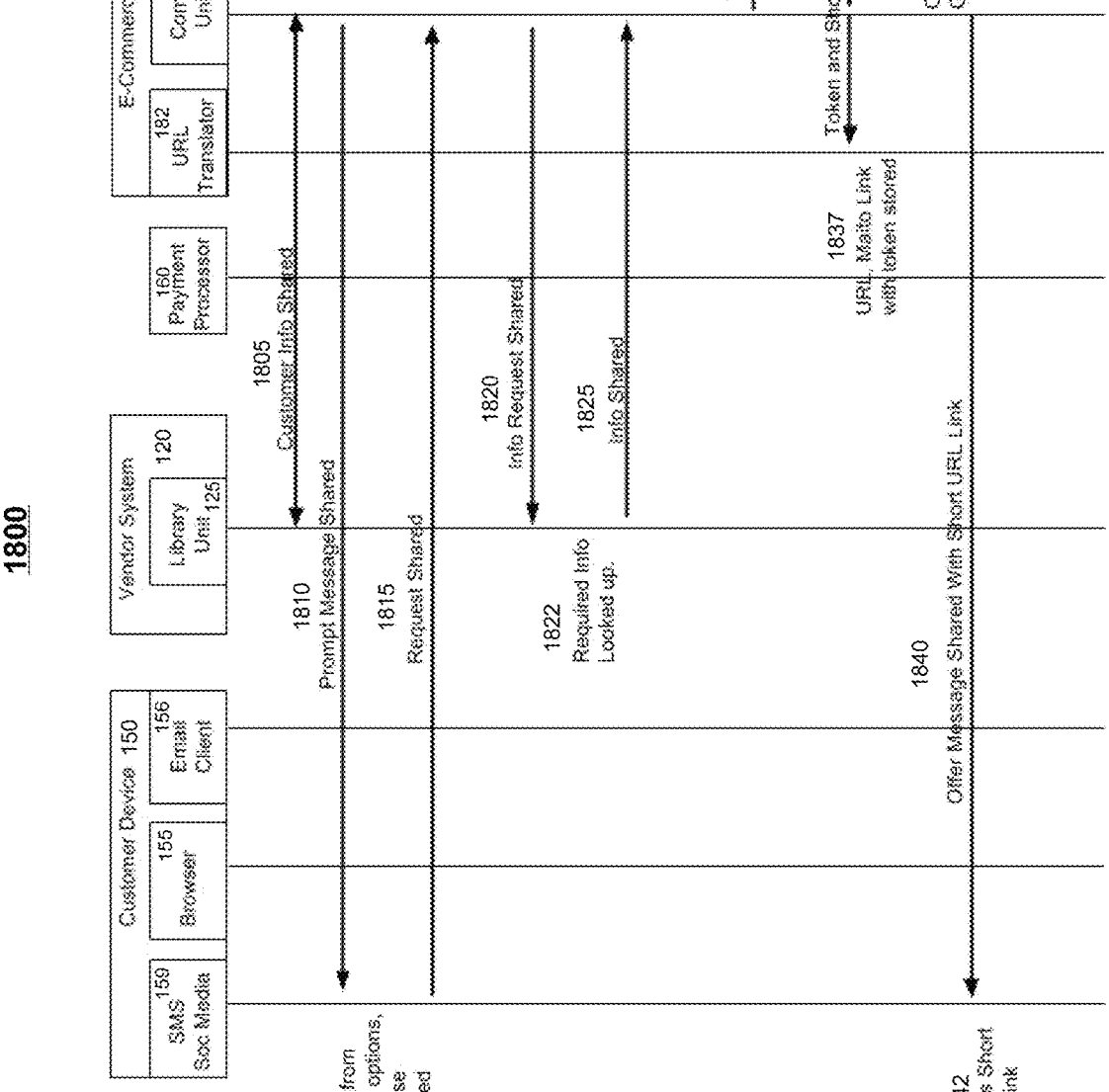
FIGS. 18A and 18B collectively illustrate a transactional flow diagram illustrating a method where the e-commerce system accesses the library of customer shopping cart activity to message a series of prompts to the customer device and based on customer responses via the customer device, the e-commerce system completes the transaction via email.
Figure 18B:
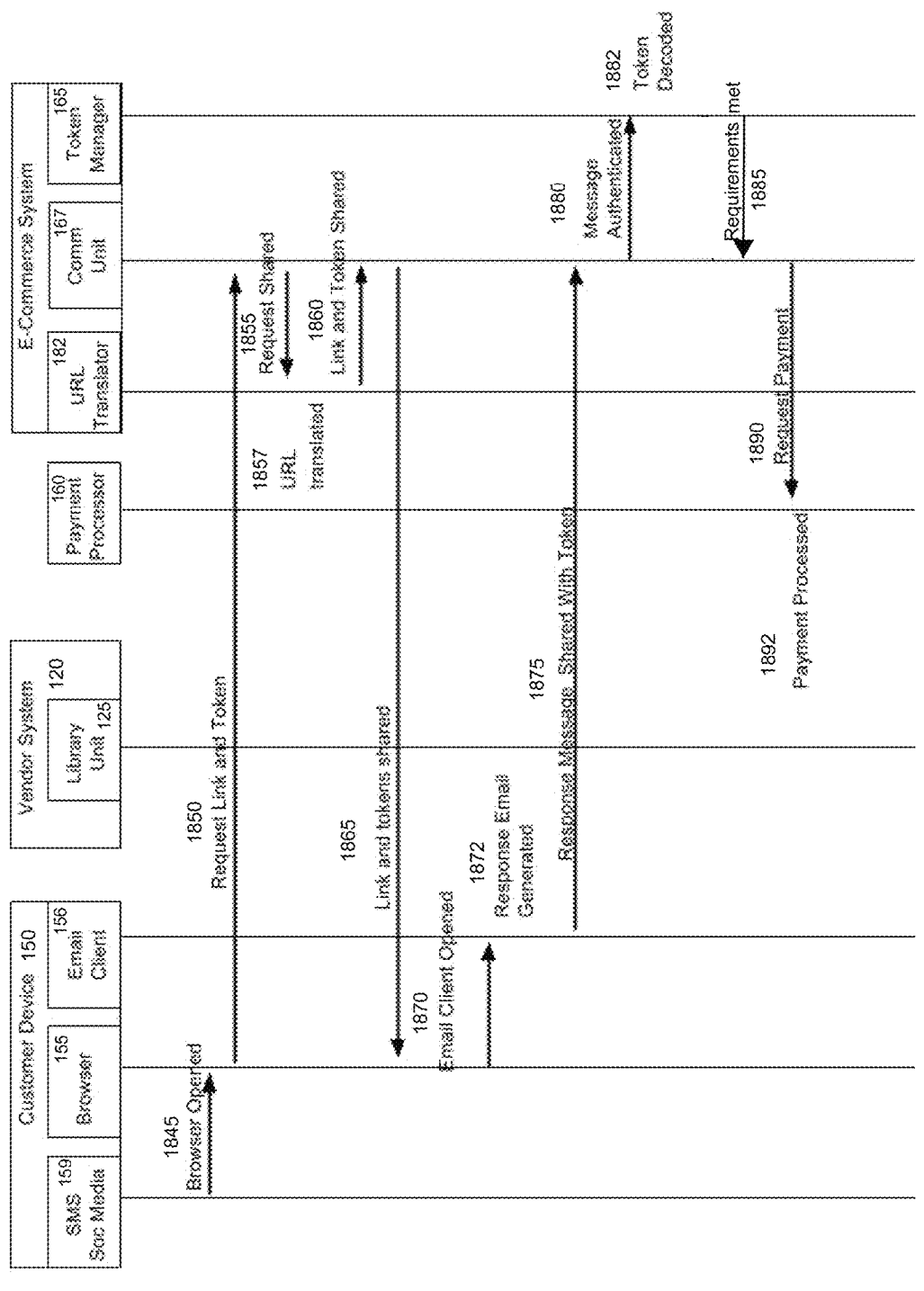

FIGS. 18A and 18B collectively illustrate a transactional flow diagram 1800 illustrating a method where the e-commerce system 140 accesses the library of customer shopping cart activity to message a series of prompts to the customer device 150 and based on customer responses via the customer device 150, the e-commerce system 140 completes the transaction via email. In flow 1800, the vendor 120 registers with the e-commerce system 140 and shares customer shopping cart information with the e-commerce system 140 at step 1805. The library unit 125 of vendor system 120 may periodically update the e-commerce system 140, sharing customer information with the communication unit 167. The communication unit 167 determines the required prompts. The communication unit 167 generates the prompt SMS or social media posting and shares the prompt with the customer device 150 at step 1810. The customer views the message using the customer device 150 via the SMS or social media application 159 and makes a selection to generate a response request message at step 1812. The response message may take many forms such as a word, a quantity, a secret pin or token. The response message is addressed to the e-commerce system 140. The response message is sent to the communication unit 167 at step 1815. The communication unit 167 authenticates the SMS or social media posting and determines if additional information is required at step 1827. If needed, the communication unit 167 requests additional information from the vendor library unit 125 at step 1820. The required information is looked up at the vendor library unit 125 at step 1822 and the information is shared with the communication unit 167 at step 1825. The communication unit 167 requests required tokens from the token manager 165 at step 1830.

The token manager 165 and URL translator 182 generate a short token and a corresponding long token at step 1832. The token manager 165 and URL translator 182 generate a short URL that corresponds to the short token and the long token and share them with the URL translator at step 1835. The URL translator 182 stores the tokens and the shortened URL at step 1837. The communication unit 167 generates an SMS offer or social media post offer message with the short URL Link at step 1838 and shares it with the customer device 150 at step 1840. There may be more than one offer and more than one link. The customer using customer device 150 via SMS or social media application 159 selects the short URL link in the message at step 1842 to which spawns browser 155 at step 1845. The browser 155 requests the mailto link and token from the communication unit 167 at step 1850. The communication unit 167 shares the request with the URL translator 182 at step 1855. The URL translator 182 translates the short URL link at step 1857 and shares the corresponding mailto link and token with the communication unit 167 at step 1860. The communication unit 167 shares the mailto link and token with the browser 155 at step 1865, triggering email client 156 at step 1870 to generate the response email with the token at step 1872. The opening of the browser may not be visible or discernable to the customer. The response email may be addressed to the e-commerce system 140 and include the token. The token may be located anywhere in any field of the email. The customer device 150 sends the email and shares the message with communication unit 167 at step 1875. The message is authenticated at step 1880. The communication unit 167 shares the token with the token manager 165 and the token is decoded at step 1882. If either the authentication or the token decoding does not meet requirements, the customer device 150 may receive a response message requesting an additional confirmation or a URL link that navigates the customer device 150 to a signup page and/or checkout. If all requirements are met, the token manager notifies the communication unit 167 that requirements are met at step 1885. The communication unit 167 makes a payment request to payment processor 160 at step 1890. The payment(s) are processed at step 1892 and updates and notifications are sent out.

Figure 19:
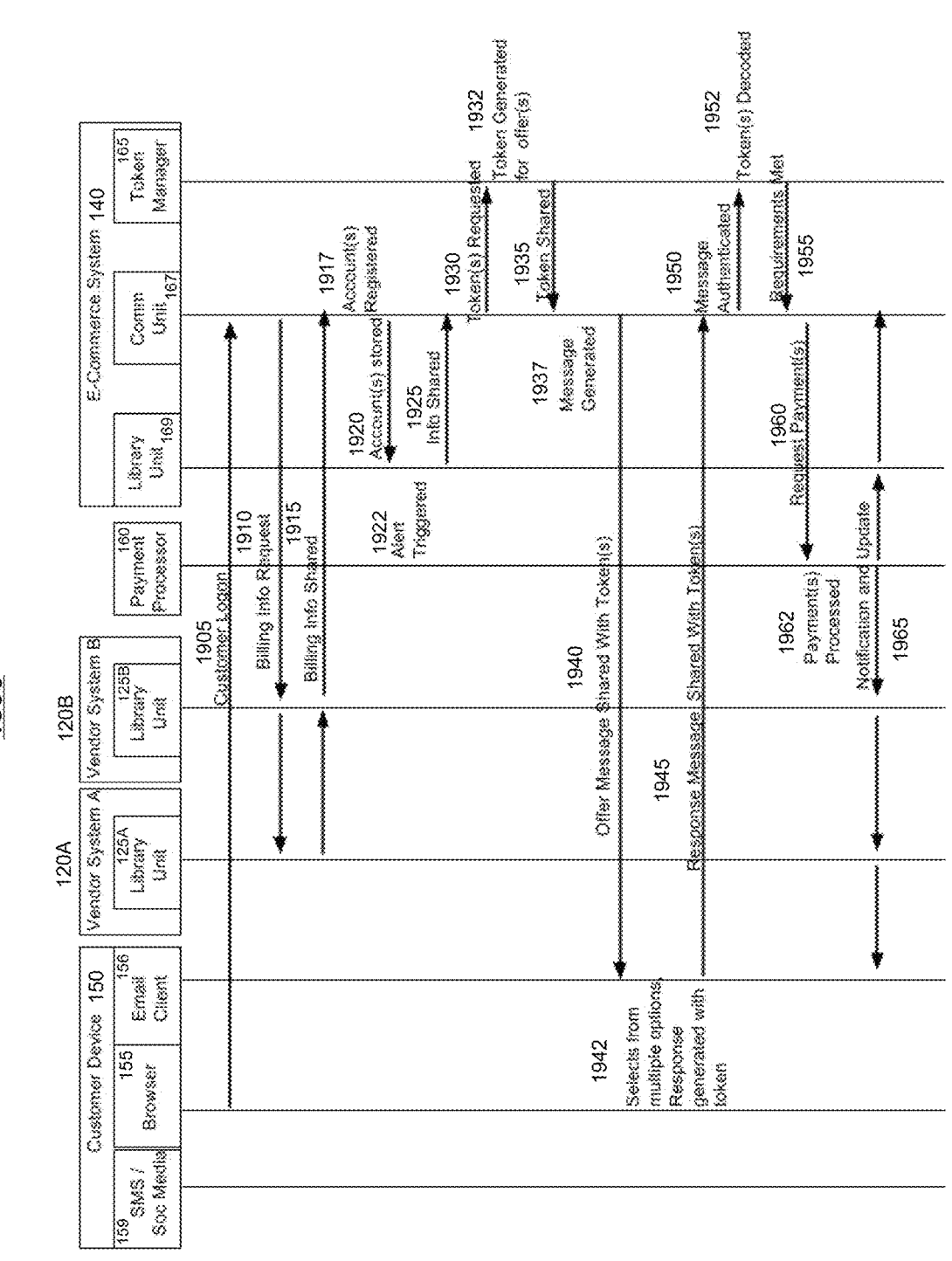
FIG. 19 is an illustration of a transactional flow diagram illustrating the processes where a customer via a customer device may request the e-commerce system to aggregate multiple payment schedules and send payment email reminders.
Figure 20:
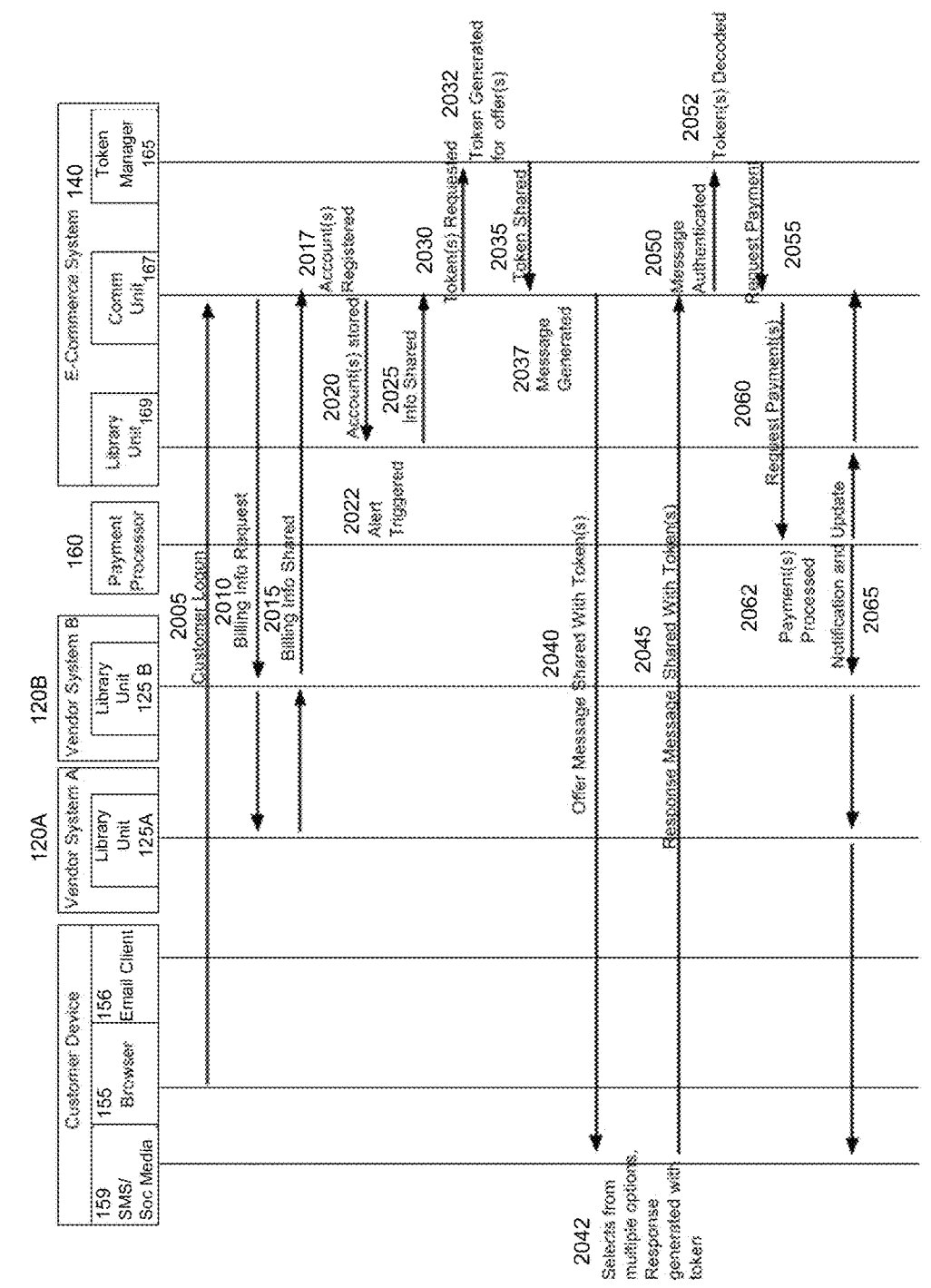
FIG. 20 is an illustration of a transactional flow diagram illustrating the processes where a customer via a customer device may request the e-commerce system to aggregate multiple payment schedules and send payment reminders via SMS or social media.

Related to the discussion of calendars with respect to FIG. 10, the present system and method provides details where registered customers using the customer device 150 of the e-commerce system 140 may aggregate multiple payment schedules through their account with the e-commerce system 140 or third party. This aggregation may occur by accessing a secure web-page account or by downloading an application that accesses the e-commerce system 140. Payment scheduling is related to the description of other figures described herein. FIG. 10 describes a single schedule payment. FIGS. 19-21 describe multiple payment schedule and various uses of media such as SMS, email and social media.

FIG. 19 is an illustration of a transactional flow diagram 1900 illustrating the processes where a customer via a customer device 150 may request the e-commerce system 140 to aggregate multiple payment schedules and send payment email reminders. Pay schedules may include paying monthly invoices, rent, credit card payments, or salaries, among other forms of payment. A customer via customer device 150 may request messaging to remind them to make payments via email. The customer may schedule a single message that combines their payments into a single authorization message and the e-commerce system 140 may process each payment separately. The customer via customer device 150 may request their bills due by messaging the e-commerce system 140. For example, if a customer wants to see what they owe on a bill, they send a 'Bill Me' message to a specific phone number. The e-commerce system 140 sends the customer device 150 the amount that is due in the next 30 days. The customer may have an option to pay each bill two days before it is due. The frequency and time periods for payment(s) may be controlled by the customer using customer device 150. Messages may also be offered to pay each bill separately or to authorize a payment at a specific time before the bill is due. For example 'Pay this bill two days before due date.' may be one option.

In this example depicted in FIG. 19 there are shown two vendors, however any number of vendors and libraries may be used. Additionally, other resources may be located in other entities. The customer using the customer device 150 may access a web browser 155 to log in to their account with the e-commerce system 140 via the communication unit 167 at step 1905. The customer may request information from the multiple vendors, for example, vendor A 120A and vendor B 120B at step 1910. Vendor A 120A and vendor B 120B may be registered with the e-commerce system 140 at step 1917. Vendor A 120A and vendor B 120B may share the required information with communication unit 167 at step 1915. The vendor system 120 may be able to update the e-commerce system 140 without the customer logon. An alert message may be triggered at step 1922 and the library unit 169 shares the required information with the communication unit 167 at step 1925. An alert may be triggered by any number of requirements such as due dates, bills, and customer scheduling. This request may also be triggered by a message sent from the customer device 150.

The communication unit 167 requests required tokens from the token manager 165 at step 1930. The token manager 165 generates the tokens for the offer(s) at step 1932 and shares the generated tokens with the communication unit 167 at step 1935. The communication unit 167 generates the offer message at step 1937 with the token in a mailto link. Each offer is associated with a mailto link and token and is shared with the customer device 150 at step 1940. The customer via customer device 150 accesses the message via the email client 156 and selects the mailto link to generate the response message addressed to the e-commerce system 140 with the token at step 1942. The token may be located anywhere in any field of the email. The message is shared with the communication unit 167 at step 1945 and the message is authenticated at step 1950. The communication unit 167 shares the token with the token manager 165 and the token is decoded at step 1952. If either the authentication or the token decoding does not meet requirements, the customer device 150 may receive a response message requesting an additional confirmation or a URL link that navigates the customer device 150 to a signup page and/or checkout. If the requirements are met, the token manager 165 notifies the communication unit 167 that requirements are met at step 1955. The communication unit 167 makes a payment request at step 1960 and shares it with the payment processor 160. The payments are processed at step 1962 and updates and notifications are sent at step 1965. Alternatively, token generation may be substituted for the method described in FIG. 8, where the email address of the ecommerce system 140 is designated exclusively to trigger an action based on the authentication of the message.

FIG. 20 is an illustration of a transactional flow diagram 2000 illustrating the processes where a customer via a customer device 150 may request the e-commerce system 140 to aggregate multiple payment schedules and send payment reminders via SMS or social media. The customer using the customer device 150 may access a web browser 155 to log in to their account with the e-commerce system 140 via the communication unit 167 at step 2005. The customer may request information from the multiple vendors, for example, vendor A 120A and vendor B 120B at step 2010. Vendor A 120A and vendor B 120B may be registered with the e-commerce system 140 at step 2017. Vendor A 120A and vendor B 120B may share the required information with communication unit 167 at step 2015. The vendor system 120 may be able to update the e-commerce system 140 without the customer logon. An alert message may be triggered at step 2022 and the library unit 169 shares the required information with the communication unit 167 at step 2025. An alert may be triggered by any number of requirements such as due dates, bills, and customer scheduling. This request may also be triggered by a message sent from the customer device 150.

The communication unit 167 requests required tokens from the token manager 165 at step 2030. The token manager 165 generates the tokens for the offer(s) at step 2032 and shares the generated tokens with the communication unit 167 at step 2035. The communication unit 167 generates the offer message at step 2037 with the token via SMS or social media post. Each offer is associated with a token and generates a response SMS or social media post addressed to the e-commerce system 140 at step 2040. The customer using SMS or social media application 159 generates the response message addressed to the e-commerce system 140 with the token as part of the message at step 2042. The SMS or social media post share the message with the communication unit 167 and the message is authenticated at step 2050. The communication unit 167 shares the token with the token manager 165 and the token is decoded at step 2052. If either the authentication or the token decoding does not meet requirements, the customer device 150 may receive a response message requesting an additional confirmation or a URL link that navigates the customer device 150 to a signup page and/or checkout. If the requirements are met, the token manager 165 notifies the communication unit 167 that requirements are met at step 2055. The communication unit 167 makes a payment request at step 2060 and shares it with the payment processor 160. The payments are processed at step 2062 and updates and notifications are sent at step 2065.

Figure 21A:
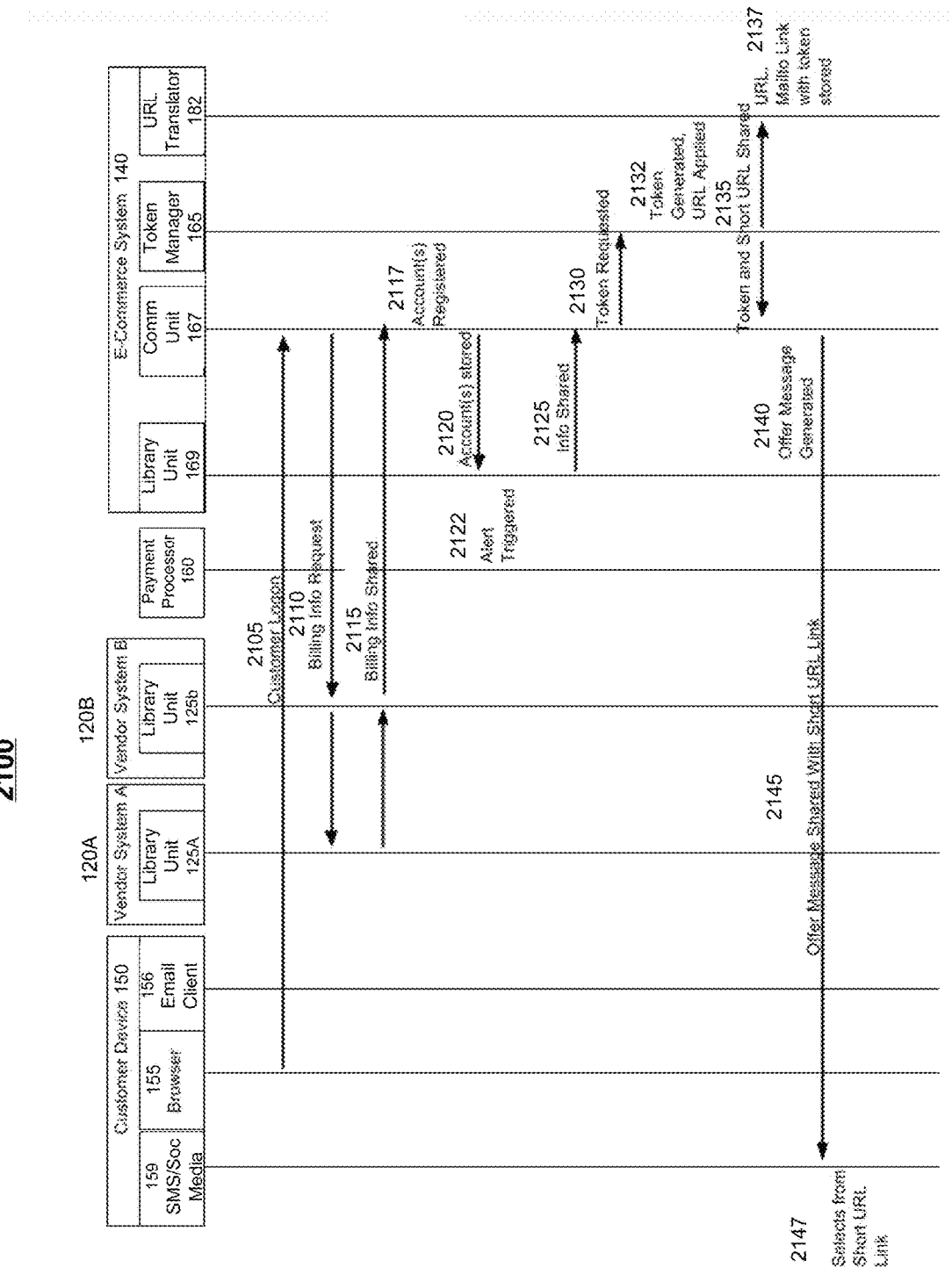
FIGS. 21A and 21B collectively illustrate a transactional flow diagram illustrating the process where a customer via customer device requests the e-commerce system to aggregate multiple payment schedules and send SMS or social media reminders to enable customers via customer device to generate response payment emails.
Figure 21B:
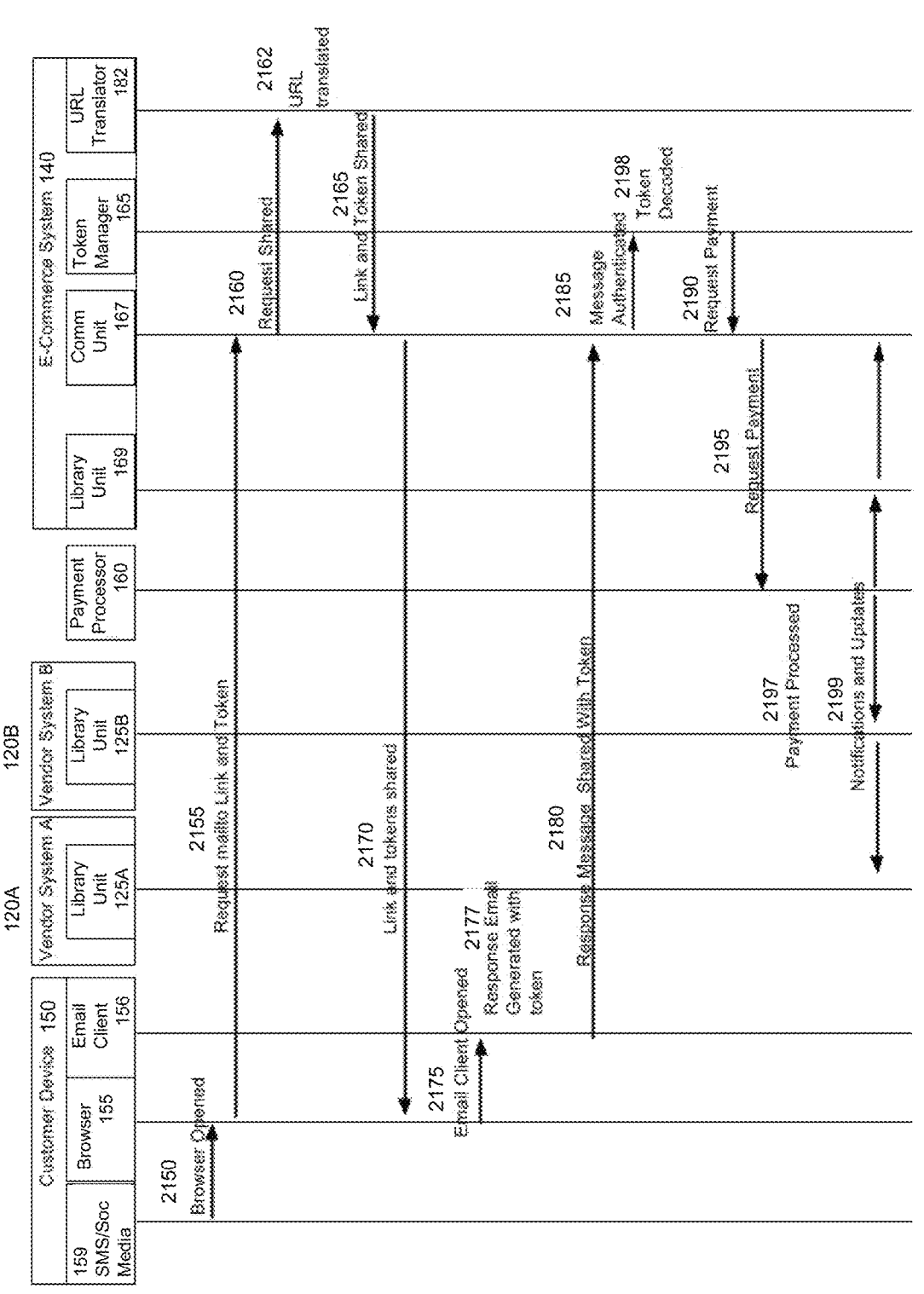

FIGS. 21A and 21B collectively illustrate a transactional flow diagram 2100 illustrating the process where a customer via customer device 150 requests the e-commerce system 140 to aggregate multiple payment schedules and send SMS or social media reminders to enable customers via customer device 150 to generate response payment emails. The customer using the customer device 150 to access a web browser, 155 logs on to their account with the e-commerce system 140 via the communication unit 167 at step 2105. The customer may request information from the multiple vendors 120, for example, vendor A 120A and vendor B 120B and allowing the e-commerce system 140 to query vendor A 120A and vendor B 120B for the information at step 2110. Vendor A 120A and vendor B 120B are both registered with the e-commerce system 140 at step 2117. Vendor A 120A and vendor B 120B both share the required information with the communication unit 167 at step 2115. The account information may be stored in the library unit 169 at step 2120.

The vendor system 120 may be able to update the e-commerce system 140 without the customer logon at step 2105. An alert message is triggered at step 2122 and the library unit 169 shares the required information with the communication unit 167 at step 2125. An alert may be triggered by any number of triggers such as due dates, bills, and customer scheduling. An alert may also be triggered by a message sent from the customer device 150.

The communication unit 167 requests, at step 2130, required tokens from the token manager 165. The token manager 165 and URL translator 182 generate a corresponding short token and long token for each request at step 2132. The token manager 165 and URL translator 182 generate a short URL link that corresponds to the short token and long token. The token manager 165 and URL translator 182 stores the tokens and the short URL link at step 2137. The token manager 165 shares the short URL link with the communication unit 167 at step 2135. The communication unit 167 generates an SMS offer or social media post offer message with a short URL link(s) at step 2140 and shares it with the customer device 150 at step 2145.

The customer via customer device 150 using SMS or social media application 159 selects from the short URL link(s) in the message at step 2147. This selection opens a web browser 155 at step 2150 which requests the mailto link and token from the communication unit 167 at step 2155. There may be multiple offers and multiple short URL links. The communication unit 167 shares the request with the URL translator 182 at step 2160. The URL translator 182 translates the short URL link at step 2162 and shares the corresponding mailto link and short token with the communication unit 167 at step 2165. The communication unit 167 shares the mailto and token with the browser 155 at step 2170 which triggers the email client 156 at step 2175. At step 2177, the email client generates the response email with short token. The opening of the browser may not be visible or apparent to the customer. The response email may be addressed to the e-commerce system 140 and the message holds the short token. The short token may be located anywhere in any field of the response email. The response email is sent at step 2180 to share the message with the communication unit 167. The response message is authenticated at step 2185. The communication unit 167 shares the short token with the token manager 165. The token manager 165 matches the short token with the long token and decodes the long token at step 2187. If either the authentication or the token decoding does not meet requirements, the customer via customer device 150 may receive a response message requesting an additional confirmation or a URL link that navigates the customer device 150 to a signup page and/or checkout. If the requirements are met, the token manager 165 notifies the communication unit 167 that requirements are met at step 2190. The communication unit 167 makes a payment request at step 2195 and shares it with the payment processor 160. The payments are processed at step 2197 and updates and notifications are sent at step 2199.

The present system and method also include a design for in-store checkout using SMS, social media, and email based checkouts. This function may also be used for mass assemblies of people, all or many of whom wish to make a payment. An example of a mass assembly may be a religious service or political rally, where the people in the congregation each desire to make a payment. The system and method may also include a televised, radio broadcast or advertisement. The e-commerce system 140 or vendor 120 may initiate a transaction online. The cashier may inform the customer of the amount owed and the telephone number to send a message via SMS. By entering the phone number into an SMS application on customer device 150 and transmitting the amount, for example, '$19.95', via SMS, may cause the e-commerce system 140 to provide an offer message sent to the customer device 150 for confirmation. Once confirmed the cashier is notified. This notification may be an SMS, social media post or email stating that the amount has been processed. The cashier may be notified via a cashier e-commerce application or an existing store application using an e-commerce plugin.

Figure 22A:
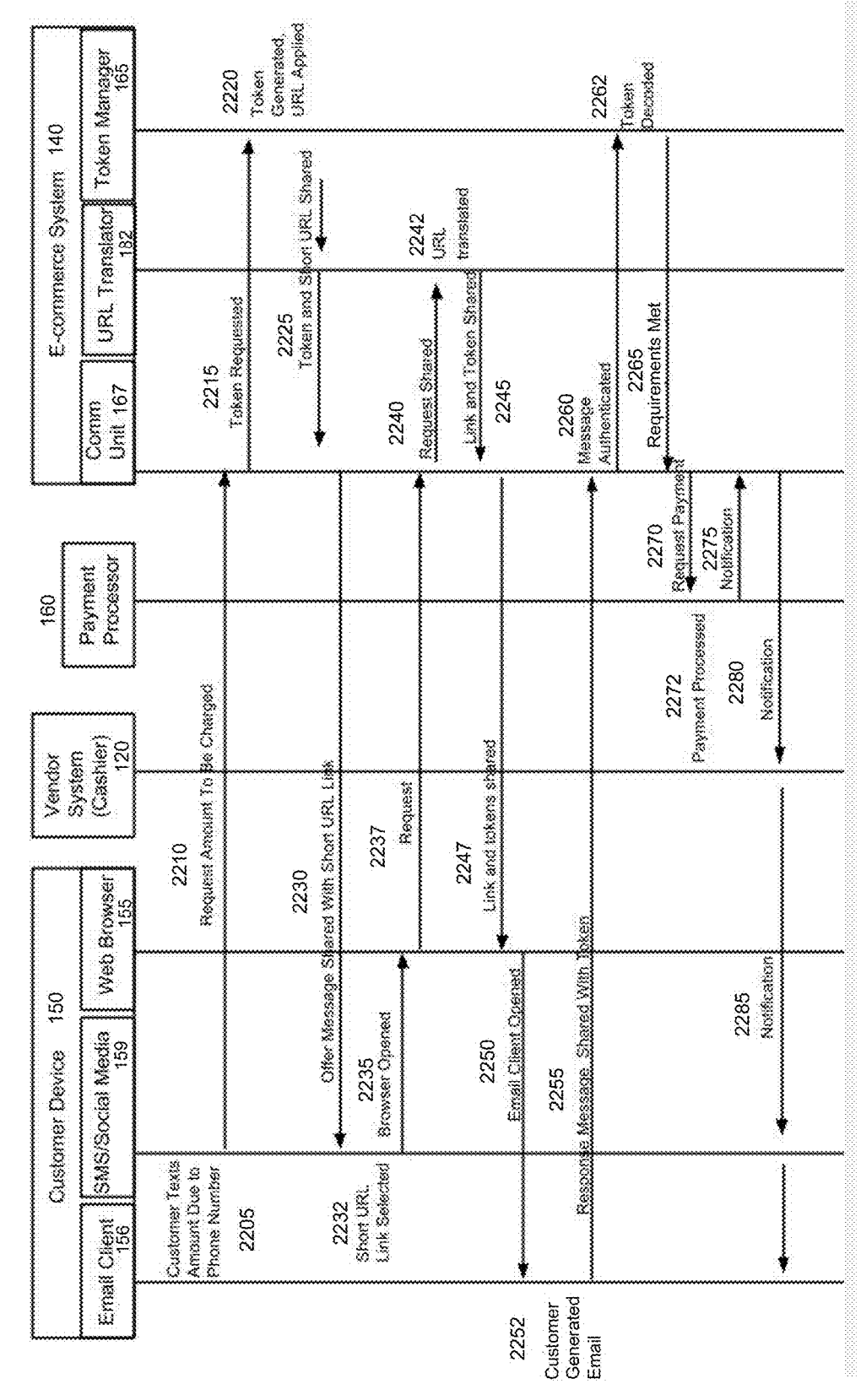
FIG. 22A is a transactional flow diagram explaining the in-store or mass assembly process where a payment is made by SMS and social media with an email-based checkout.

FIG. 22A is a transactional flow diagram 2200 explaining the in-store or mass assembly process where a payment is made by SMS and social media with an email-based checkout. In the example depicted in diagram 2200, the customer may be in a store trying to make a payment, such as pay a bill, or make a donation, using customer device 150. The customer may be verbally told or optically provided the amount owed by a cashier for example. A phone number accepting the payment may also be provided. The customer, using the customer device 150 with the SMS or social media application 159, messages the phone number or posts to the social media account of vendor 120 at step 2205.

Figure 22B:
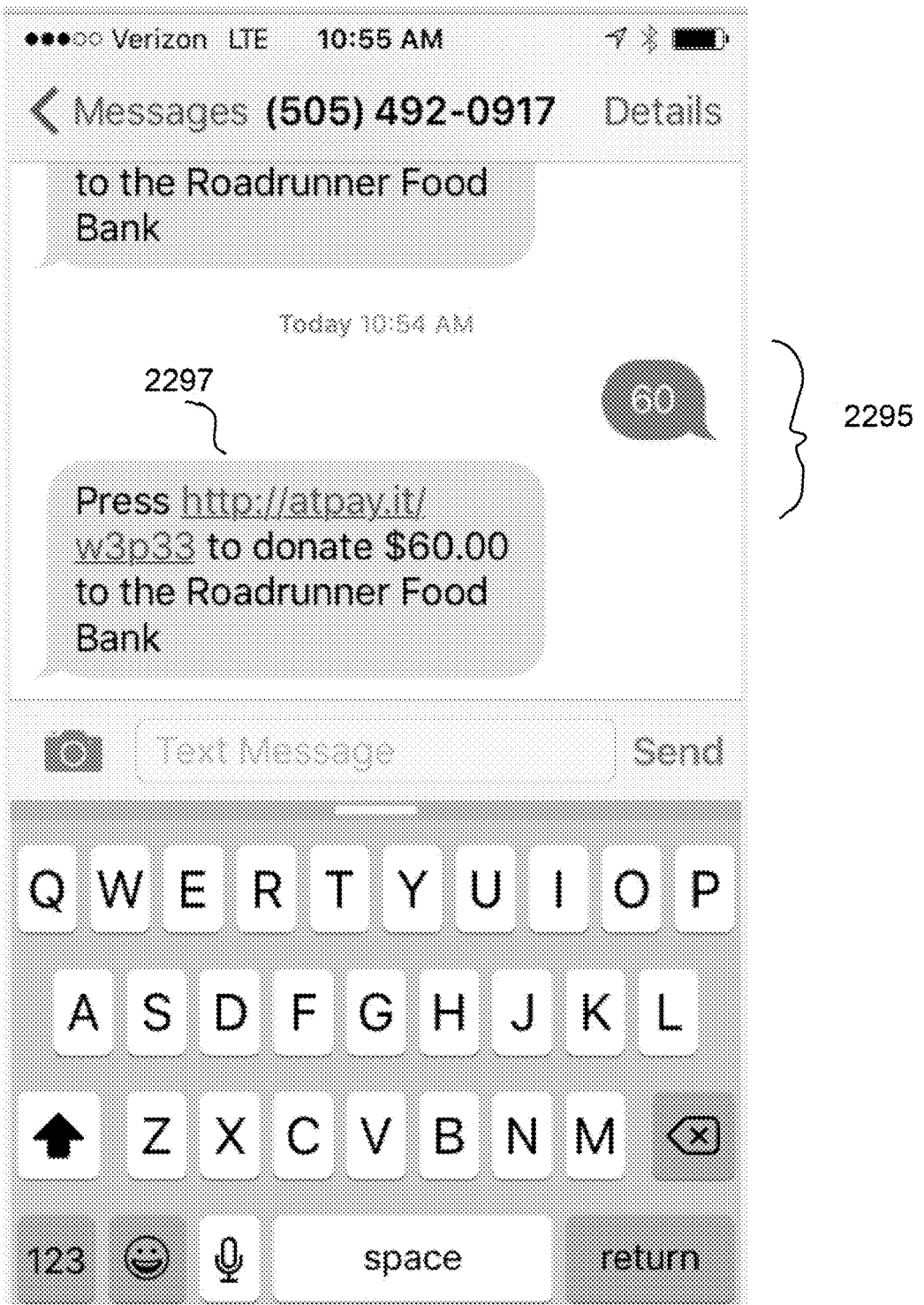
FIG. 22B illustrates a message of an SMS message where the customer messages the amount they wish to pay or $60.

Referring now also to FIG. 22B, which depicts an illustrative message 2290 of an SMS message where the customer messages the amount they wish to pay or $60 2295. The customer device 150 shares the message containing the amount of the charge with the communication unit 167 at step 2210. The communication unit 167 requests at step 2215 a short token and a corresponding long token to be generated by the token manager 165. The short token and long token are generated by the token manager 165 at step 2220. A short URL applied to that short token and long token by the token manager 165 and the URL translator 182 at step 2225. The short URL corresponds to the short token and long token. The short URL is shared with the communication unit 167. The communication unit 167 generates an offer message with the short URL link and shares it with the customer device 150 at step 2230.

FIG. 22B illustrates an example of the short URL link. This message may be in the form an SMS, email social media post or may appear on a web browser. The customer, using the application on their device 150, selects the URL link 2297 as confirmation of the payment at step 2232. There may be multiple options and multiple short links for each offer. When a short URL is selected, the browser 155 on customer device 150 is initiated at step 2235 and the mailto link with token is requested from the communication unit 167 at step 2237.

Figure 22C:
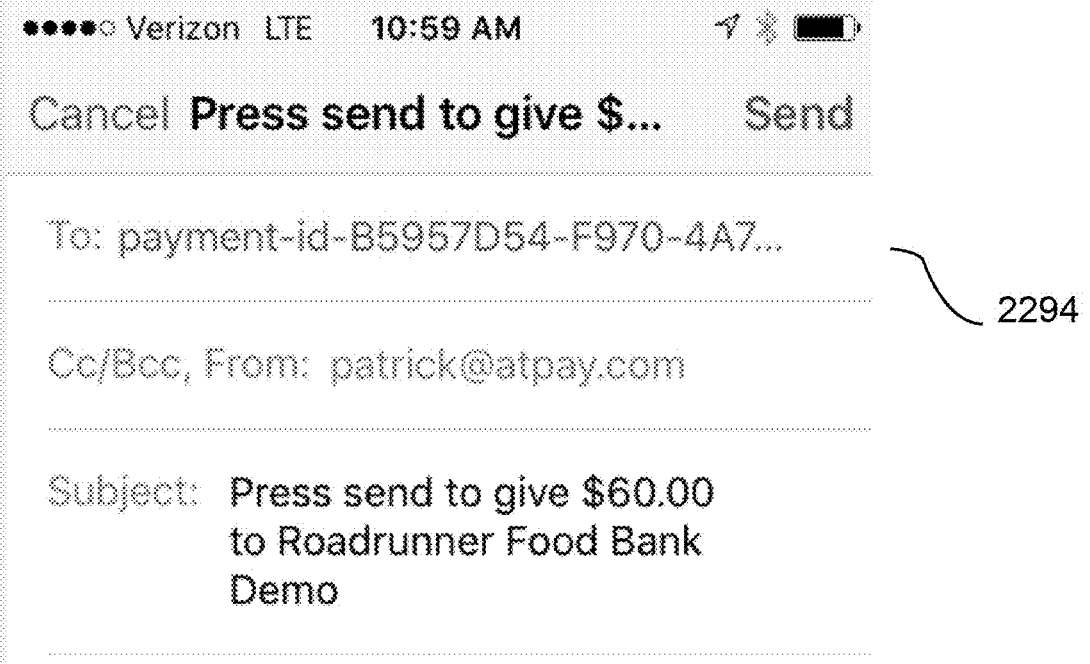
FIG. 22C illustrates an example of the response email.

The communication unit 167 shares the request at step 2240 with the URL translator 182, which translates the short URL at step 2242 and shares the mailto link and short token with the communication unit 167 at step 2245. The communication unit 167 shares the mailto link and short token with the customer device 150 web browser 155 at step 2247. The customer may not see the activation of the web browser 155. This triggers the email client 156 at step 2250 to generate the response email with the short token at step 2252. The short token may be in any field and the email is addressed to the e-commerce system 140. FIG. 22C illustrates an example of the response email 2293. The token is integrated into the email address 'To:' field 2294. The token may be anywhere in the email. The email may not require a token as described in FIG. 8. The email is sent at step 2255 to the communication unit 167 which authenticates the message at step 2260 and shares the short token with the token manager 165. The token manager 165 matches the short token with the long token. The long token is decoded at step 2262 by the token manager 165. If either the authentication or the token decoding does not meet requirements, the customer device 150 may receive a response message requesting an additional confirmation or a URL link that navigates the customer to a signup page and/or checkout. If the requirements are met, the token manager 165 notifies the communication unit 167 that the requirements are met at step 2265. The communication unit 167 makes a payment request at step 2270 and shares it with the payment processor 160. The payments are processed at step 2272 and updates and notifications are sent out at steps 2275, 2280, 2285.

Figure 23:
FIG. 23 is transactional flow diagram illustrating a request for payment by SMS and/or social media with an email-based payment method using the mailto link in a SMS and/or social media post not requiring a token.
Figure 24A:
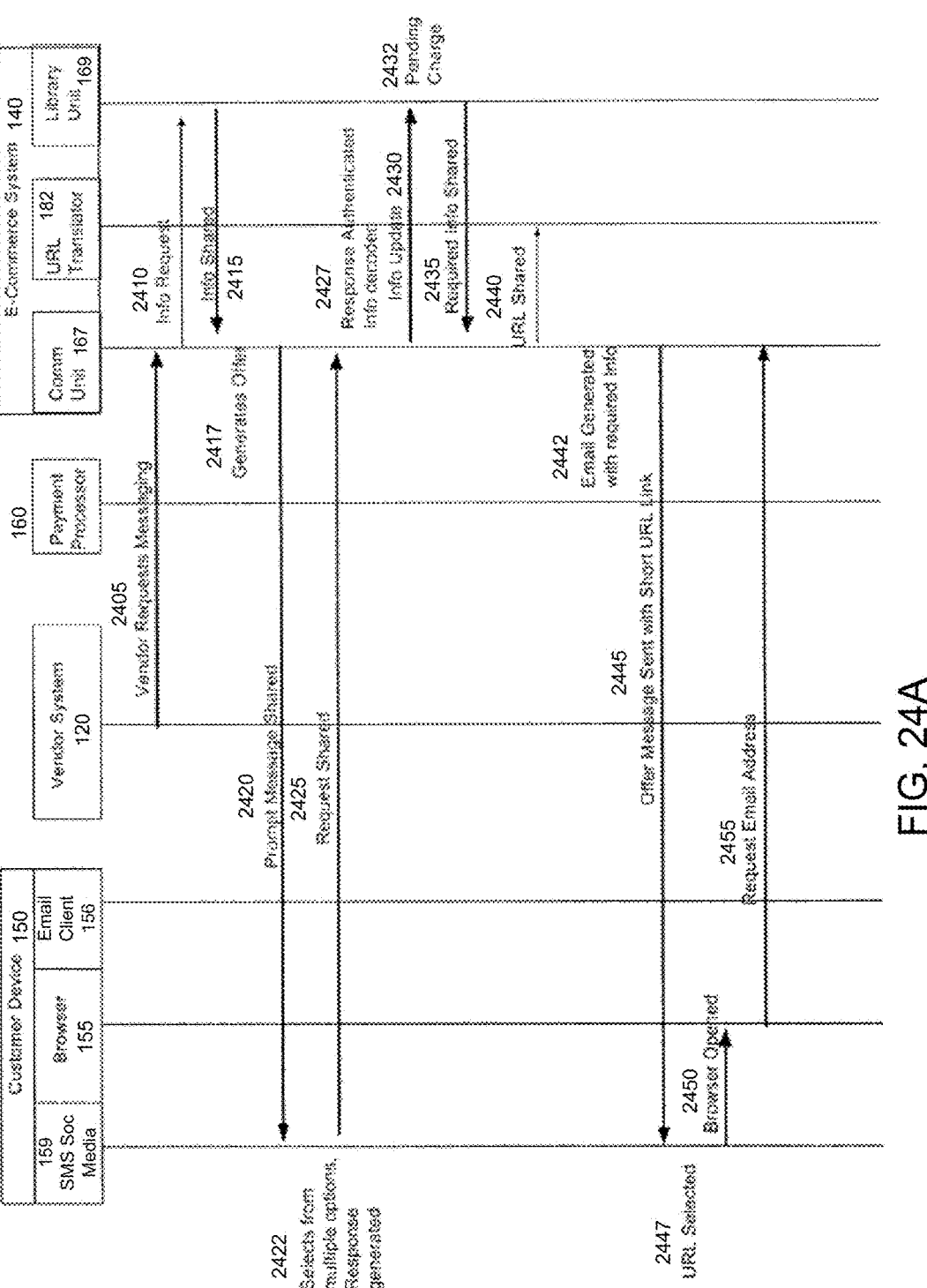
FIGS. 24A and 24B collectively is a transactional flow diagram illustrating a request for payment by SMS and/or social media with an email-based payment method using a short URL link in a SMS and/or social media post.
Figure 24B:
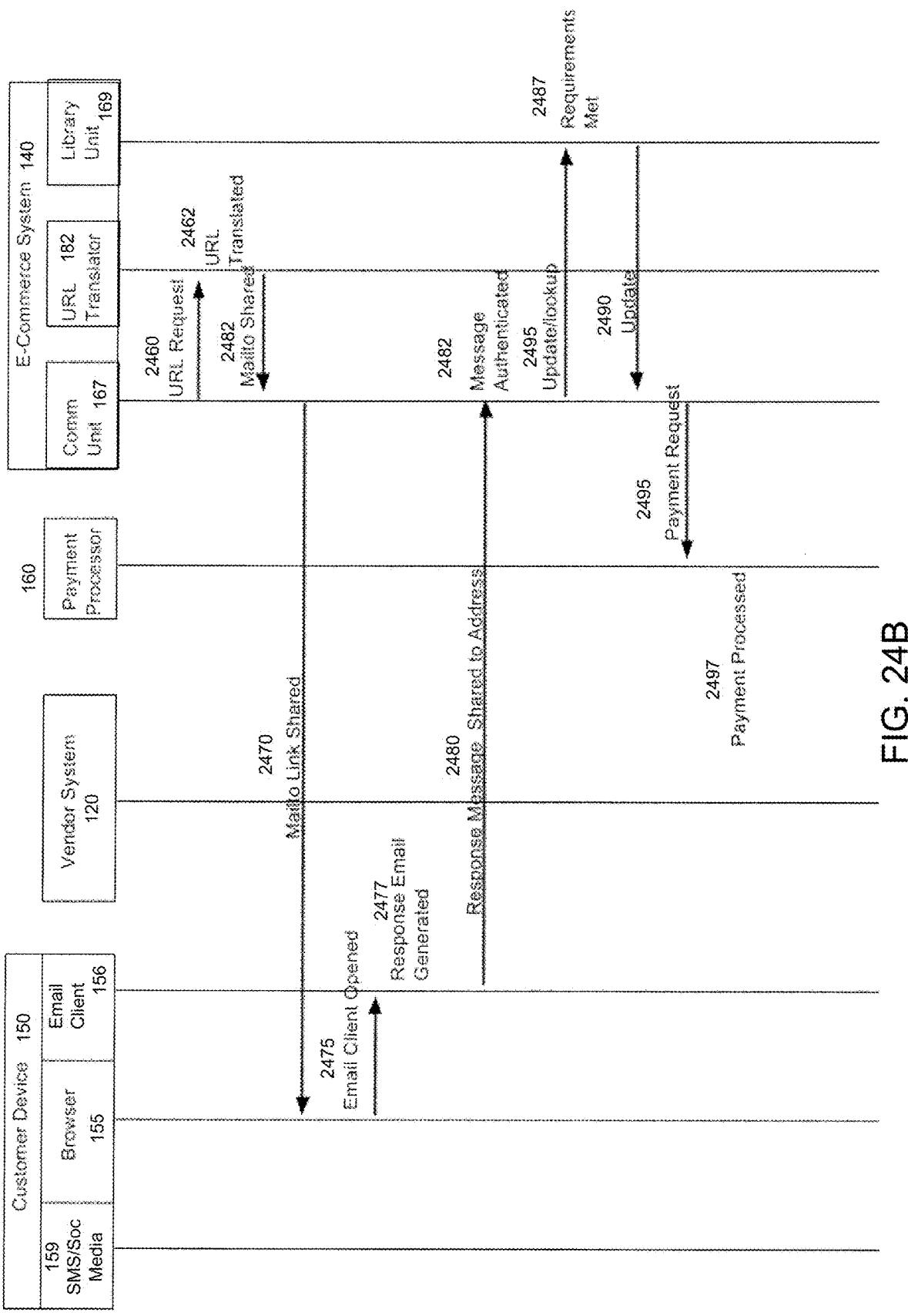

FIGS. 23, 24A and 24B disclose a design related to FIGS. 8 and 9 where the e-commerce system processes transactions based on registered email addresses arriving at an address that determine a specific action.

FIG. 23 is transactional flow diagram 2300 illustrating a request for payment by SMS and/or social media with an email-based payment method using the mailto link in a SMS and/or social media post not requiring a token. The vendor 120 requests an offer message be sent from the communication unit 167 at step 2305. The communication unit 167 requests the required information from the library unit 169 at step 2310 and the library unit 169 shares the required information with the communication unit 167 at step 2315. The communication unit 167 generates an SMS and/or social media post at step 2317 and shares the generated prompt with the customer device 150 at step 2320. The customer using the customer device 150 views the message on the SMS or social media application 159 and selects an option to generate the response at step 2322. The generated response is shared with the communication unit 167 at step 2325. For example, the customer may be asked to identify the amount of money they wish to donate. The customer inputs $20 into customer device 150 and shares that amount with the communication unit 167. The communication unit 167 authenticates the message and decodes the information at step 2327. The communication unit 167 updates the library unit 169 at step 2330 and the library unit 169 stores a pending charge at step 2332 associated with the customer. The library unit 169 shares the required information with the communication unit 167 at step 2335. The communication unit 167 generates an offer SMS and/or social media message at step 2337 addressed to the account associated with the customer's other account addresses (email) and shares the offer message with the customer device 150 using the SMS or social media application 159 at step 2340. This message may include at least one mailto link.

The customer, using the customer device 150, may view the message on the SMS or social media application 159. The customer selects the mailto link which opens the email client 156 and generates the response email addressed to the required email address of the e-commerce system 140 at step 2345. This mailto link may be embedded behind an image. There may be other written content required for other purposes including legal requirements and/or user experience. The response email with the required address may be shared at step 2350. The communication unit 167 authenticates the message at step 2352 using, but not limited to, SPF DKIM. Based on the combination authentication and the knowledge of the sender and received addresses, the communication unit 167 updates the library unit 169 at step 2355 and requests payment info. The communication unit 167 and library unit 169 determine that all requirements are met at step 2357. If either the authentication or the token decoding does not meet requirements, the customer via customer device 150 may receive a response message requesting an additional confirmation or a URL link that navigates the customer to a signup page and/or checkout. If all requirements are met at step 2357, the library unit 169 updates the communications unit 167 at step 2360 with a payment request and the communications unit 167 shares a payment request with the payment processor 160 at step 2365. The payment is then processed at step 2367 and notifications and updates are shared.

FIGS. 24A and 24B collectively is a transactional flow diagram 2400 illustrating a request for payment by SMS and/or social media with an email-based payment method using a short URL link in a SMS and/or social media post. The vendor 120 requests an offer message be sent from the communication unit 167 at step 2405. The communication unit 167 requests the required information at step 2410 from the library unit 169. The library unit 169 shares the required information with the communication unit 167 at step 2415. The communication unit 167 generates at step 2417 an SMS and/or social media post and shares a prompt with the customer device 150 at step 2420. The customer using the customer device 150 views the message on the SMS or social media application 159 and selects an option in the message at step 2422. The customer device 150 sends a message back to the communication unit 167 at step 2425 and shares their request. For example, the customer may be asked to write the amount of money they wish to donate. The customer enters '$20' into their customer device 150 and shares that message with the communication unit 167. The communication unit 167 authenticates the message and decodes the information at step 2427. The communication unit 167 updates the library unit 169 at step 2430 and the library unit 169 stores a pending charge associated with the customer at step 2432. The library unit 169 shares the required information with the communication unit 167 at step 2435. The communication unit 167 generates a mailto link with the required address for the payment and a shortened URL link associated with that mailto link and shares this with the URL translator 182 at step 2440. The communication unit 167 generates a SMS and/or social media post with the short URL link at step 2442 and shares them with the customer device 150 at step 2445.

The customer using the customer device 150 views the SMS and/or social media post on an application. The customer using the customer device 150 via SMS or social media 159 selects the short URL link at step 2447 which opens the browser 155 at step 2505. The browser 155 requests the required mailto link from the communication unit 167 at step 2455. The communication unit 167 shares the request with the URL translator 182 at step 2460. The URL translator 182 translates the short URL to the associated mailto link at step 2462 and shares this with the communication unit 167 at step 2465. The communication unit 167 shares the mailto link with the web browser 155 at step 2470 which triggers the email client 156 to open at step 2475. The email client 156 generates the response email with the required address at step 2477. There may be other written content required for other purposes such as legal or user experience. The customer device 150 shares response email with the required address at step 2480. The communication unit 167 authenticates the message at step 2482 using, but not limited to, SPF DKIM. Based on the combination authentication and the knowledge of the sender and received addresses, the communication unit 167 updates the library unit 169 and requests payment info at step 2485. The communication unit 167 and library unit 169 determine that all requirements are met at step 2487. If either the authentication or the token decoding does not meet requirements, the customer device 150 may receive a response message requesting an additional confirmation or a URL link that navigates the customer to a signup page and/or checkout. If all requirements are met, the library 169 updates the communications unit 167 with a payment request at step 2490 and the communications unit 167 shares a payment request with the payment processor 160 at step 2495. The payment is then processed at step 2497 and notifications and updates are shared.

The present system and method also includes an e-commerce system 140 that integrates SMS and other texting formats, social media, email and pledges with e-commerce payment processing described herein. Donors and customers often prefer to promise to make a payment prior to actually making the payment. Fundraisers refer to this as a pledge. For-profit vendors may use this as an online shopping cart, preorder or in a crowdsourcing capacity. For the non-profit it is an opportunity to identify donors who are considering making a donation. Currently, the process of pledging is disorganized and unsystematic. The present system and method collects pledges through various media and allows non-profits to automate the pledging process into a payment process. The e-commerce system 140 collates pledge responses into a list of potential donors. The e-commerce system 140 then provides various ways in which the non-profit or vendor may use the information, such as visual displays of pledging totals or the solicitation of payment based on a pledge. As disclosed herein, a vendor 120 may be substituted for nonprofit or fundraiser.

The e-commerce system 140 offers customers and donors multiple ways to donate and make purchases. In order to use the e-commerce system 140, customers via customer device 150 may be required to provide a wide range of information. Customers who do not wish to provide all of the required information may choose to provide only part of the required information. The present system and method enables customers to make a pledge for a future payment without fully registering with the e-commerce system 140. The e-commerce system 140 is designed to follow up and remind the customer to register and complete the payment for their donation or purchase. Additionally, vendors 120 and fundraisers may access the status of these pledges at any time and use that for marketing and research.

Figure 25:
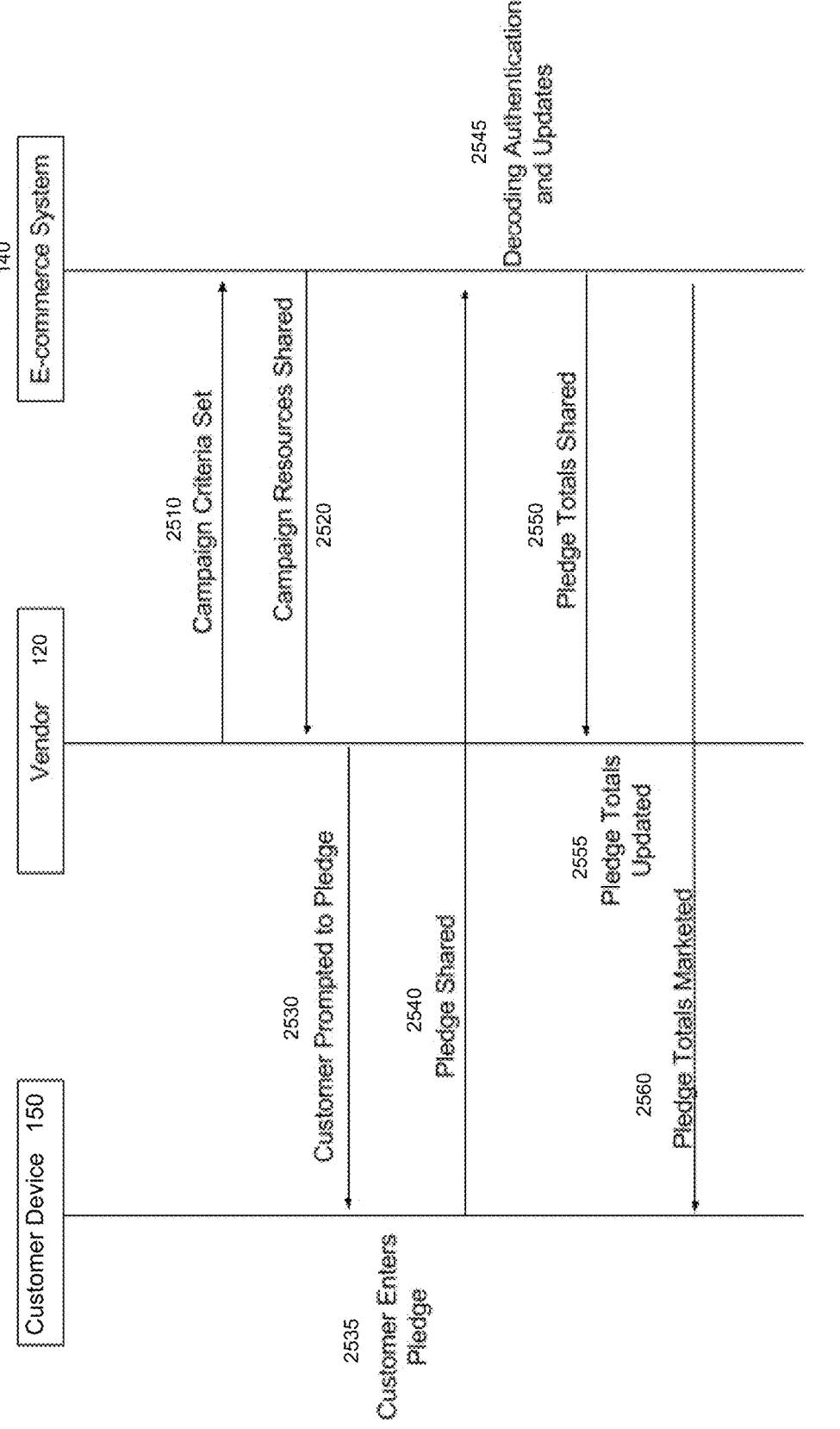
FIG. 25 is a transactional flow diagram illustrating the process where a customer uses customer device to pledge to make a payment and the vendor may use those totals for marketing and payment.

FIG. 25 is a transactional flow diagram 2500 illustrating the process where a customer uses customer device 150 to pledge to make a payment and the vendor 120 may use those totals for marketing and payment. A vendor 120 using a vendor device accesses the e-commerce system 140 and sets the criteria for a campaign at step 2510. For example, the vendor may generate a series of links that represent a pledge with each link of the series representing a different amount of money or a phone number where customers may message pledges with display graphics among other attributes. The e-commerce system 140 generates various resources such as payment capture pages and payment buttons or links that may be used in messaging and webpages.

The e-commerce system 140 shares the campaign resources with the vendor 120 at step 2520. The vendor 120 uses these materials in their marketing. For example, the e-commerce system 140 may provide the vendor 120 with a phone number which the vendor 120 may use in print advertising to gather pledges from customers or they may email or post on social media a link that is associated with a pledge amount at step 2530. Alternatively, the marketing messaging may come from the e-commerce system 140 directly on behalf of the vendor 120. The customer using customer device 150 enters the pledge amount at step 2535. The pledge amount is shared with the e-commerce system 140 at step 2540. The e-commerce system 140 decodes and authenticates the message at step 2545. The e-commerce system 140 updates the e-commerce system database with the new pledge information. There may be additional messaging required to determine the pledge. Depending on the customer's choice of media for conveying the pledge at step 2540, the e-commerce system 140 stores their email address, phone number or social media information. Although not depicted in this diagram, payment processing and registration may occur based on the customer's registration status.

The e-commerce system 140 shares the pledge totals at step 2550 with the vendor 120. The e-commerce system 140 may also share totals and results based on the vendor's 120 criteria with the customers through customer device 150 at step 2560. For example the vendor 120 may provide a graphic representation of the total pledges. Although FIG. 25 describes a general method of processing a pledge that may precede a payment, pledging may be substituted for payment processing in FIGS. 8B, 12 and 13.

Figure 26:
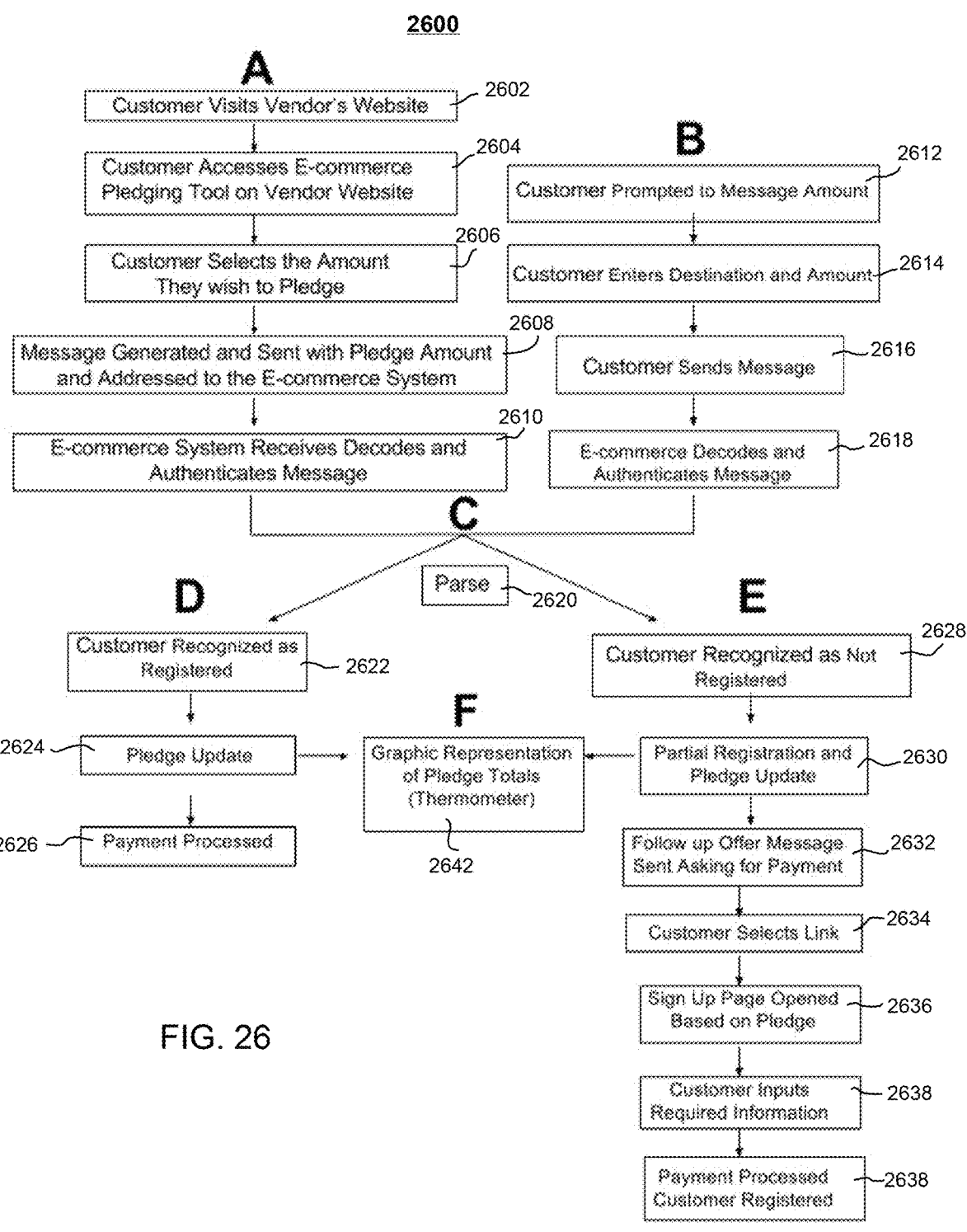
FIG. 26 illustrates a method configured to allow a customer to make a pledge.

FIG. 26 is a diagram 2600 illustrating the steps required for the e-commerce system 140 to process pledges, provide updates and payment options. Pledges generally are the expression of the desire or promise to make a payment. Pledges may provide value to vendors 120 beyond the eventual monetary payment. Alternatively, a pledge may include a promise to take action. For vendors 120, pledges are a way to gauge the amount a customer is able or willing to donate or purchase. This data adds value to marketing campaigns and often spurs customer participation in fundraisers and sales. The present system integrates a series of marketing tools for collecting pledges and integrates them into the disclosed system 100.

FIG. 26 illustrates a method 2600 configured to allow a customer to make a pledge. Method 2600 includes six section identified as sections A, B, C, D, E and F. Section A illustrates a hosted web page or iframe window that floats on the vendor's site. Section B illustrates a situation where the customer is prompted to message the e-commerce system their pledge. Section C illustrates the step where all pledges from customers are parsed based on whether the customers are registered or not registered with the e-commerce system. Section D illustrates a portion of method 2600 allowing a customer registered with the e-commerce system 140 to complete a pledge. Section E illustrates a portion of method 2600 allowing a customer not registered with the e-commerce system 140 to complete a pledge. Section F illustrates a portion of method 2600 where the e-commerce system 140 provides updates on pledge totals, such as a campaign's status.

The customer using the customer device 150 accesses the website of the vendor 120 using a web browser or other application at step 2602. The customer accesses the pledging tool which may be an iframe inserted on top of the page or may be a dedicated webpage on the site of the vendor 120 at step 2604. In one example, this may be a series of mailto links each associated with a different amount the customer may wish to pledge. Alternatively, the customer may be able to use customer device 150 to enter an amount they wish to pledge at step 2606 and a link may be generated for the transaction by the e-commerce system 140 at step 2608. This may occur because the customer using the customer device 150 selects the mailto link and triggers the email client to open, for example. Using the email client, the response email is generated and may include the token. The response email may be addressed to the e-commerce system 140. The token may be anywhere in the email. The customer device 150 sends the email sharing the token with the e-commerce system 140. The e-commerce system 140 authenticates the email and decodes the token at step 2610. Alternatively, the customer may enter their information using the customer device 150 on the webpage of the vendor 120 and submit the information via the webpage.

The customer device 150 is prompted to send a message to the e-commerce system 140 identifying the pledge at step 2612. This prompt may be verbal, print based, email SMS, social media based or another form of messaging. The prompt requires the customer using the customer device 150 to enter at step 2614 and send a message to a specific address identifying the amount at step 2616. The address may be associated with the vendor 120. This address may be managed by the e-commerce system 140. The e-commerce system 140 receives, decodes and authenticates the message at step 2618. The pledges from customers are parsed based on whether the customers are registered or not registered with the e-commerce system at step 2620.

The customer is recognized as registered with the e-commerce system 140 at step 2622. The customer pledge is updated at step 2624 to the vendor 120 campaign based on the amount the customer chose to pledge. Based on the customer's status as registered with the e-commerce system 140, the e-commerce system 140 may process the payment based on the pledge amount at step 2626. Alternatively, the e-commerce system 140 may message the customer device 150 a confirmation message requiring a response to the e-commerce system 140 in order to complete the payment.

The e-commerce system 140 recognizes that the customer is not registered at step 2628. The customer may be partially registered. The customer pledge is updated to the vendor campaign based on the amount the customer chose to pledge and the address of the customer at step 2630. Based on the customer's status as partially registered with the e-commerce system 140, the e-commerce system 140 generates a follow up offer message and sends it on behalf of the vendor 120 at step 2632. This message may have a link included in the message. The customer using the customer device 150 accesses the message by selecting the link at step 2634. By selecting the link the browser application is triggered on the customer device 150 opening a signup web page based on the pledge amount at step 2636. The customer via customer device 150 enters the required information for the payment at step 2638 and the customer device 150 submits the information for payment. If all requirements are met, the e-commerce system 140 processes the payment at step 2640.

Based on the campaign requirements, the e-commerce system 140 may periodically update the vendor 120 and customer device 150 on the amounts pledged at step 2642. For example the e-commerce system 140 may provide a graph displaying the amount donated up to that point. The customer device 150 may receive these graphs from the vendor 120 or the e-commerce system 140. The vendor 120 may have the capacity to limit information that customer devices 150 can access based on registration factors.

The above disclosed invention presents to vendors 120 many business opportunities. The tools may be used to leverage relationships with other vendors 120 and customers via customer devices 150. Even if these tools are not used by vendors 120 they are useful within the operation of the e-commerce system 140. The ability to associate customer devices 150 with specific vendors 120, the ability to segment email lists and to reference payment offers are features that improve security and scaling. If vendor 120 security is compromised, some accounts may be shut down until the breach is resolved letting a portion of the customer device 150 continue to access the e-commerce system 140. The disclosed invention may be integrated directly into the vendor system 120 or a third party such as an Email Service Provider 170, Customer Relationship Management, social media, SMS, telecommunications or Email Client.

Although in the above examples the vendor 120 sends messages to prompt the customer into making payments, the customer via customer device 150 may initiate a request for payment on their own. A customer may use customer device 150 view a printed ad or be told verbally where to message the required requests to begin the process. Although the library unit 169 and URL translator 182 are located in the e-commerce system 140 this is only an example, the units 169, 182 may be configured and located elsewhere. For example, the payment processor 160 may also be the vendor 120 or the e-commerce system 140 may be integrated with the payment processor 160.

Various kinds of cardholders and banking instruments may be used to process payments which may not be dependent on carrier participation in the payment processing. This may include a virtual currency such as bitcoin. This may also integrate a gift card system.

Additionally, a payment processor 160 could also be a vendor 120 and offer payments by email. Payment processors 160 and the associated payment gateways may be integrated with the e-commerce system 140 and restrict access to other payment processors 160 and associated gateways.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a customer device or any host computer.

What is claimed is:

1. A method for providing an email as a command that improves security of a transaction using Simple Mail Transfer Protocol (SMTP), the method comprising:

assigning a transaction-specific email address for the transaction, the transaction-specific email address being associated with a token that encodes a transaction identifier and an expiration time;

receiving, via SMTP, a message that is addressed to the transaction-specific email address;

authenticating the message, the authenticating comprising (i) evaluating a Domain-based Message Authentication, Reporting & Conformance (DMARC) policy for a domain of the message and confirming identifier alignment between a From: header domain and at least one of a DomainKeys Identified Mail (DKIM) signing domain or a Sender Policy Framework (SPF) authenticated domain, and (ii) decoding the token and verifying the token using a public/private key pair of a system and determining that the expiration time has not elapsed; and performing an action for the transaction only when (i) and (ii) succeed.

2. The method of claim 1, wherein the authenticating of the message is based on an address where the message originated.

3. The method of claim 2, wherein the address where the message originated is associated with a sender of the message.

4. The method of claim 1, wherein the message is received in response to activation of a link contained in a QR code.

5. The method of claim 1, wherein the message is received in response to activation of a link contained in a Short Message Service (SMS) message.

6. The method of claim 1, wherein the message is received in response to activation of a link embedded in an image.

7. The method of claim 1, wherein a sender of the message is a customer using a customer device.

8. The method of claim 1, wherein the assigning is initiated based on a request from a vendor.

9. The method of claim 1, the method further comprising: providing a sender of the message a sign-up when the message is not authenticated.

10. The method of claim 9, wherein the sign-up is a provided Universal Resource Locator (URL) link.

11. The method of claim 1, further comprising requesting details of the action based on the message.

12. A non-transitory computer-readable storage medium storing instructions that, when executed by one or more processors, cause the one or more processors to perform operations comprising:

assigning a transaction-specific email address for a transaction, the transaction-specific email address being associated with a token that encodes at least a transaction identifier and an expiration time;

receiving, via SMTP, a message addressed to the transaction-specific email address;

authenticating the message, the authenticating comprising: (i) evaluating a Domain-based Message Authentication, Reporting & Conformance (DMARC) policy for a domain indicated in a From header of the message and confirming identifier alignment between the From header domain and at least one of a DomainKeys Identified Mail (DKIM) signing domain or a Sender Policy Framework (SPF) authenticated domain, and (ii) decoding the token and verifying the token using a public key corresponding to a private key of a system and determining that the expiration time has not elapsed; and performing an action for the transaction only when the authenticating in (i) and (ii) succeeds.

13. The non-transitory computer readable storage medium of claim 12, wherein the message is received in response to activation of a link contained in a QR code.

14. The non-transitory computer readable storage medium of claim 12, wherein the message is received in response to activation of a link contained in a Short Message Service (SMS) message.

15. The non-transitory computer readable storage medium of claim 12, wherein the message is received in response to activation of a link embedded in an image.

16. A system for providing an email as a command that improves security of a transaction using Simple Mail Transfer Protocol (SMTP), the system comprising:

a communication interface;

a memory; and one or more processors communicatively coupled to the communication interface and the memory, the one or more processors configured to:

assign a transaction-specific email address for the transaction, the transaction-specific email address being associated with a token that encodes at least a transaction identifier and an expiration time;

receive, via SMTP, a message addressed to the transaction-specific email address;

authenticate the message by (1) evaluating a Domain-based Message Authentication, Reporting & Conformance (DMARC) policy for a domain indicated in a From header of the message and confirming identifier alignment between the From header domain and at least one of a DomainKeys Identified Mail (DKIM) signing domain or a Sender Policy Framework (SPF) authenticated domain, and (ii) decoding the token and verifying the token using a public key corresponding to a private key of the system and determining that the expiration time has not elapsed; and perform an action for the transaction only when the authenticating in (i) and (ii) succeeds.

17. The system of claim 16, wherein the message is received in response to activation of a link contained in a QR code.

18. The system of claim 16, wherein the message is received in response to activation of a link contained in a Short Message Service (SMS) message.

19. The system of claim 16, wherein the message is received in response to activation of a link embedded in an image.

* * * * *